United States Patent
Hayama

(10) Patent No.: US 10,299,314 B2
(45) Date of Patent: May 21, 2019

(54) AUTONOMOUS MOBILE ROBOT, MOVEMENT CONTROL METHOD, MOVEMENT CONTROL PROGRAM, AND SYSTEM

(71) Applicant: Panasonic Intellectual Property Corporation of America, Torrance, CA (US)

(72) Inventor: Satoru Hayama, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/845,117

(22) Filed: Dec. 18, 2017

(65) Prior Publication Data

US 2018/0213597 A1 Jul. 26, 2018

(30) Foreign Application Priority Data

Jan. 24, 2017 (JP) .................................. 2017-010136

(51) Int. Cl.
*B62D 1/28* (2006.01)
*G05D 1/02* (2006.01)
(Continued)

(52) U.S. Cl.
CPC ............ *H04W 84/18* (2013.01); *B62D 1/283* (2013.01); *G05D 1/0246* (2013.01); *G05D 1/101* (2013.01); *H04L 29/08567* (2013.01); *H04L 67/125* (2013.01); *H04W 4/023* (2013.01); *H04W 4/027* (2013.01); *H04W 4/046* (2013.01); *H04W 4/46* (2018.02); *H04W 40/28* (2013.01); *H04W 76/14* (2018.02); *H04W 76/19* (2018.02)

(58) Field of Classification Search
CPC .... G05D 1/101; G05D 1/0246; G05D 1/0891; G05D 1/0088; G01C 21/26; B62D 57/032; B62D 1/283; B62D 57/00; B62D 57/02; B62D 57/024; B25J 5/00; B25J 9/1633; B25J 9/1674; G06F 19/00; H04L 29/08567; H04W 4/023; H04W 4/027; H04W 4/046; H04W 40/28; H04W 76/14; H04W 76/19; H04W 76/023; H04W 76/028; H04W 84/18; Y10S 901/01
See application file for complete search history.

(56) References Cited

FOREIGN PATENT DOCUMENTS

JP        2012-253533        12/2012

*Primary Examiner* — Marsha D Banks Harold
*Assistant Examiner* — Dharmesh J Patel
(74) *Attorney, Agent, or Firm* — Greenblum & Bernstein, P.L.C.

(57) ABSTRACT

A mobile body includes a direction identifying unit that identifies a direction in which a communication target mobile body is positioned and a control unit that moves the mobile body by a first control amount indicating a pair consisting of a first absolute velocity value and a first velocity direction. Upon detecting that predetermined information is no longer received from the communication target mobile body, the control unit determines a second control amount by which the autonomous mobile robot is to be moved in the direction identified by the direction identifying unit and which indicates a pair consisting of a second absolute velocity value and a second velocity direction, and the control unit generates a second control command to switch the first control amount to the second control amount and move the autonomous mobile robot and outputs the generated second control command to a drive unit.

12 Claims, 17 Drawing Sheets

(51) Int. Cl.
*G05D 1/10* (2006.01)
*H04W 4/02* (2018.01)
*H04W 4/46* (2018.01)
*H04L 29/08* (2006.01)
*H04W 40/28* (2009.01)
*H04W 76/14* (2018.01)
*H04W 76/19* (2018.01)
*H04W 84/18* (2009.01)
*H04W 4/04* (2009.01)

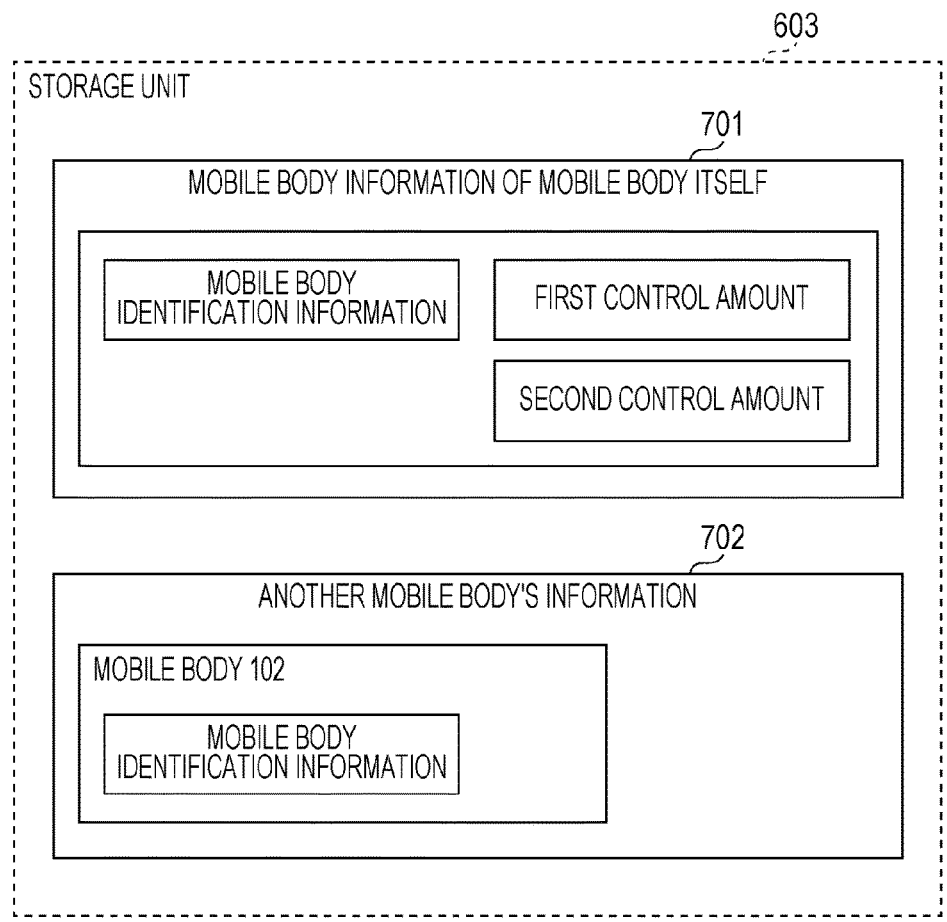

AUTONOMOUS MOBILE ROBOT, MOVEMENT CONTROL METHOD, MOVEMENT CONTROL PROGRAM, AND SYSTEM

BACKGROUND

1. Technical Field

The present disclosure relates to an autonomous mobile robot that autonomously moves while communicating with a communication target device, a movement control method for controlling the movement of an autonomous mobile robot, a movement control program that controls the movement of an autonomous mobile robot, and a system including a communication target device and an autonomous mobile robot.

2. Description of the Related Art

A method for controlling the movement of a mobile body in order to maintain communication among a plurality of mobile bodies that form an ad hoc network has been developed (refer to, for example, Japanese Patent No. 5695979). In the method, every two of unmanned mobile bodies form a pair. Each of the mobile bodies includes an indicator lamp that indicates the status thereof and a camera that captures the image of the indicator lamp of the other mobile body in the pair. Thus, each of the mobile body detects the status of the other mobile body. Each of the pairs serves as a node of the ad hoc network. In this manner, even when one of the mobile bodies in a pair is disconnected from the network, the other mobile body is still connected to the network. Consequently, communication among the plurality of mobile bodies that form the ad hoc network can be maintained.

SUMMARY

However, in the existing technology, if both of the mobile bodies forming a pair cannot directly communicate with all of the mobile bodies forming the other pairs, some or all of the connections among the plurality of mobile bodies forming the ad hoc network are lost. Thus, it is difficult to restore the communication.

In one general aspect, the techniques disclosed here feature an autonomous mobile robot including a drive unit that drives the autonomous mobile robot, a control unit that outputs, to the drive unit, a first control command to move the autonomous mobile robot by a first control amount indicating any one of a pair consisting of a first movement distance and a first movement direction, a pair consisting of a first absolute velocity value and a first velocity direction, and a pair consisting of a first absolute acceleration value and a first acceleration direction, a communication unit that receives predetermined information transmitted from at least one communication target device that differs from the autonomous mobile robot and that forms a network with the autonomous mobile robot, a detection unit that detects the communication target device, and a direction identifying unit that identifies a direction in which the communication target device detected by the detection unit is positioned. Upon detecting that the predetermined information is no longer received by the communication unit, the control unit determines a second control amount by which the autonomous mobile robot is to be moved in the direction identified by the direction identifying unit and which indicates any one of a pair consisting of a second movement distance and a second movement direction, a pair consisting of a second absolute velocity value and a second velocity direction, and a pair consisting of a second absolute acceleration value and a second acceleration direction. The control unit generates a second control command to switch the first control amount to the second control amount and move the autonomous mobile robot and outputs the generated second control command to the drive unit.

According to the present disclosure, even when the communication between an autonomous mobile robot and the communication target device forming a network with the autonomous mobile robot is lost, the autonomous mobile robot can move closer to the communication target device and, thus, the communication between the autonomous mobile robot and the communication target device can be restored.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 illustrates an example of information stored in a storage unit of the mobile body according to the exemplary embodiment of the present disclosure;

FIG. 8 illustrates an example of mobile body information of the mobile body itself stored in a storage unit of the mobile body according to the exemplary embodiment of the present disclosure;

DETAILED DESCRIPTION

Underlying Knowledge Forming Basis of the Present Disclosure

An ad hoc network technology has been developed in which a plurality of mobile bodies having communication capabilities communicate with one another directly or indirectly by relaying communication between other mobile bodies (refer to, for example, Japanese Patent No. 5695979).

In an ad hoc network formed by a plurality of mobile bodies, if some of the mobile bodies forming the ad hoc network malfunction or are too far away from each other, communication among some or all of the mobile bodies forming the ad hoc network is broken and, thus, the ad hoc network is divided.

A technique for preventing the ad hoc network from being divided even in such a case is described in, for example, Japanese Patent No. 5695979.

For example, Japanese Patent No. 5695979 describes a technique for maintaining communication among a plurality of mobile bodies that form an ad hoc network. In the technique, every two of the unmanned mobile bodies form a pair. Each of the mobile bodies includes an indicator lamp that indicates the status thereof and a camera that captures the image of the indicator lamp of the other mobile body in the pair. Thus, each of the mobile body detects the status of the other mobile body. The pair serves as a node of the ad hoc network. In this manner, even when communication from one of the mobile bodies in a pair is lost, the communication still continues via the other mobile body. Consequently, communication among the plurality of mobile bodies that form the ad hoc network can be maintained.

However, in the technology described in Japanese Patent No. 5695979, if both of the mobile bodies forming the pair cannot directly communicate with all of the mobile bodies forming the other pairs, some or all of the connections among the plurality of mobile bodies forming the ad hoc network are lost. Thus, it is difficult to restore the communication.

Figure 1:
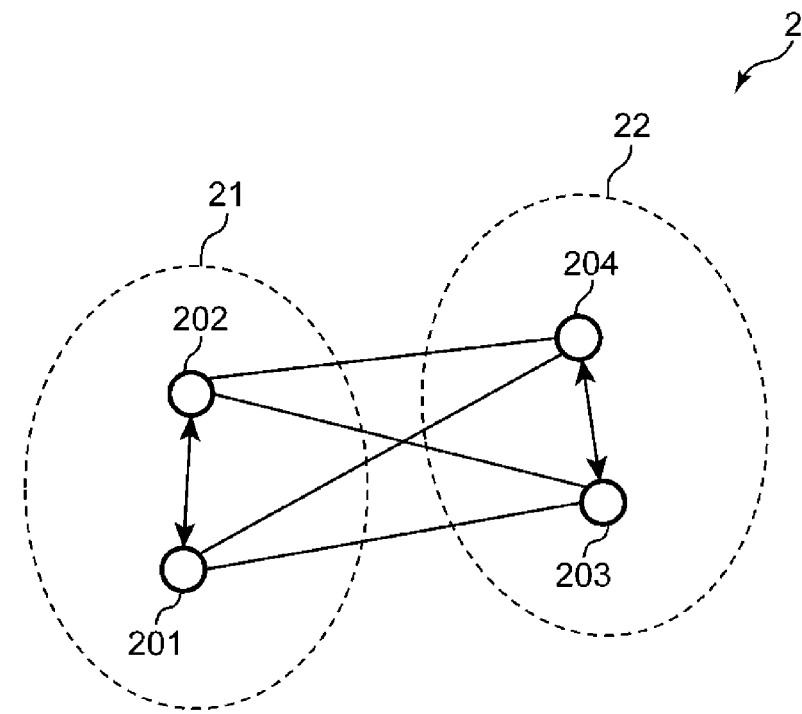
FIG. 1 is a conceptual diagram illustrating an example of an entire ad hoc network including a plurality of mobile bodies according to an existing technology.

For example, a situation illustrated in FIG. 1 is discussed below.

FIG. 1 is a conceptual diagram illustrating an example of an entire ad hoc network formed by a plurality of mobile bodies described in Japanese Patent No. 5695979.

As illustrated in FIG. 1, an ad hoc network 2 includes mobile bodies 201 to 204 having communication capabilities. A solid line extending between the circles representing the mobile bodies indicates that direct communication is possible between these mobile bodies. In the ad hoc network illustrated in FIG. 1 and the subsequent figures, each of the mobile bodies is represented by a circle, and a solid line extending between the circles indicates that direct communication is possible between the mobile bodies. In addition, a double-headed solid-line arrow extending between the circles representing mobile bodies indicates that the mobile bodies located at either end of the arrow form a pair and can be directly communicated with each other while exchanging their individual states by using an indicator lamp and a camera provided on each of the mobile bodies. The indicator lamp displays the state of one mobile body in a pair, and the camera captures the image of the indicator lamp of the other mobile body in the pair. In the figures illustrating the ad hoc network described in Japanese Patent No. 5695979, mobile bodies forming a pair are connected to each other by using a double-headed solid-line arrow.

In the ad hoc network 2, the mobile body 201 and the mobile body 202 form a pair 21, and the mobile body 203 and the mobile body 204 form a pair 22.

In addition, in the ad hoc network 2, the mobile body 201 and the mobile body 202 can directly communicate with each other. The mobile body 201 and the mobile body 203 can directly communicate with each other. The mobile body 201 and the mobile body 204 can directly communicate with each other. The mobile body 202 and the mobile body 203 can directly communicate with each other. The mobile body 202 and the mobile body 204 can directly communicate with each other, and the mobile body 203 and the mobile body 204 can directly communicate with each other.

Furthermore, each of the mobile bodies 201 to 204 can relay communication between any two of the other mobile bodies. Therefore, for example, the mobile body 201 and the mobile body 203 can indirectly communicate with each other through a relay path from the mobile body 201 to the mobile body 203 via the mobile body 202 or a relay path from the mobile body 201 to the mobile body 203 via the mobile body 204.

Figure 2:
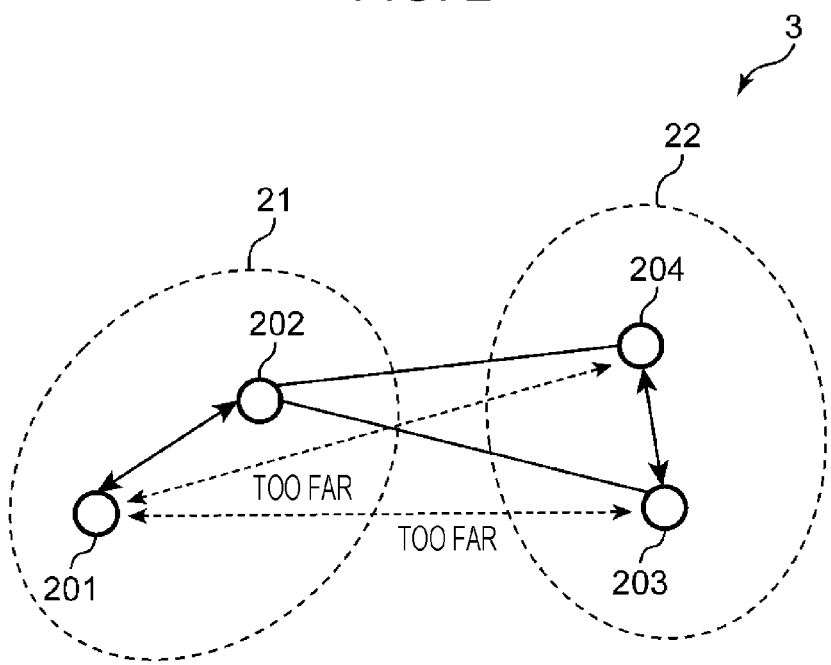
FIG. 2 is a conceptual diagram illustrating an example of an entire ad hoc network in which only one of mobile bodies in a pair is too far from a mobile body in another pair according to the existing technology.

FIG. 2 is a conceptual diagram illustrating an example of the entire ad hoc network described in Japanese Patent No. 5695979 in the case where only one of mobile bodies in a pair is too far from each of mobile bodies in the other pair. The same numbering is used in referring to FIG. 2 as is utilized above in describing FIG. 1, and description of the same constituent element is not repeated.

In the ad hoc network 2 illustrated in FIG. 1, direct communication between the mobile body 201 and the mobile body 203 and direct communication between the mobile body 201 and the mobile body 204 are lost due to the mobile body 201 being too far from the mobile body 203 and the mobile body 204. Accordingly, the ad hoc network 2 changes to an ad hoc network 3 illustrated in FIG. 2.

However, since the mobile body 201 and the mobile body 202 form the pair 21, the mobile body 201 and the mobile body 202 can directly communicate with each other. Thus, the communication between the mobile body 201 and the mobile body 203 and the communication between the mobile body 201 and the mobile body 204 are both maintained by indirect communication via the mobile body 202. That is, in this case, the technique described in Japanese Patent No. 5695979 can allow communication among the plurality of mobile bodies forming an ad hoc network to be maintained.

Figure 3:
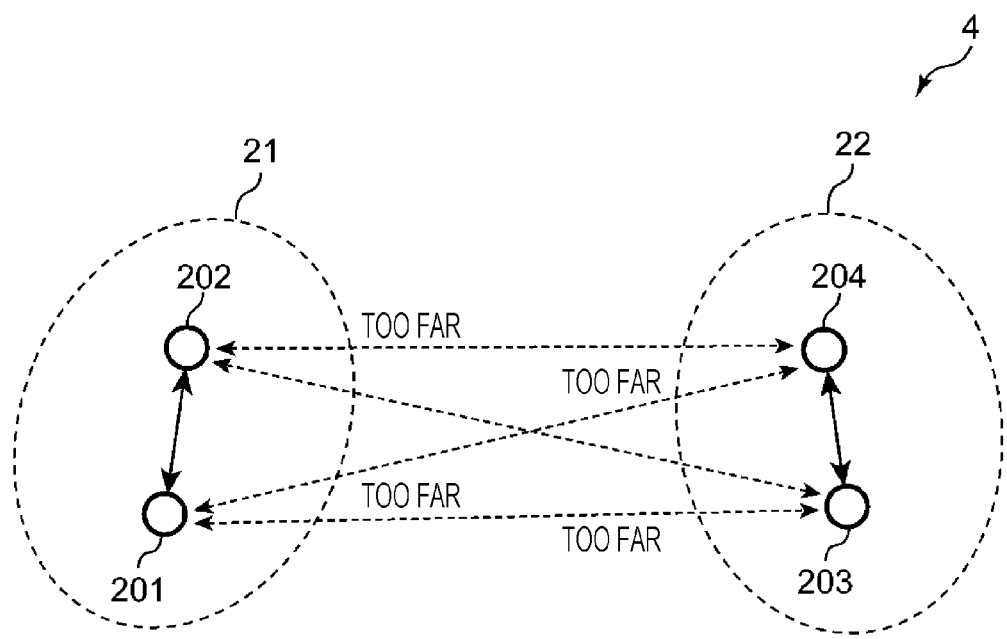
FIG. 3 is a conceptual diagram illustrating an example of an entire ad hoc network in which both of mobile bodies in a pair are too far from a mobile body in another pair according to the existing technology.

FIG. 3 is a conceptual diagram illustrating an example of an entire ad hoc network described in Japanese Patent No. 5695979 in the case where both the mobile bodies in a pair are too far from each of mobile bodies in another pair. The same numbering is used in referring to FIG. 3 as is utilized above in describing FIG. 1, and description of the same element is not repeated.

If, in the ad hoc network 2 illustrated in FIG. 1, both the mobile body 201 and the mobile body 202 are too far from the mobile body 203 and the mobile body 204, direct communication between the mobile body 201 and the mobile body 203 is lost. In addition, direct communication between the mobile body 201 and the mobile body 204 is lost, the direct communication between the mobile body 202 and the mobile body 203 is lost, and the direct communication between the mobile body 202 and the mobile body 204 is lost. Accordingly, the ad hoc network 2 changes to an ad hoc network group 4 illustrated in FIG. 3.

In this case, since the mobile body 201 and the mobile body 202 form the pair 21, the mobile body 201 and the mobile body 202 can directly communicate with each other. However, since direct communication between each of the mobile body 201 and the mobile body 202 and each of the mobile body 203 and the mobile body 204 forming the pair 22 is lost, even indirect communications between the mobile body 201 and the mobile body 203, between the mobile body 201 and the mobile body 204, between the mobile body 202 and the mobile body 203, and between the mobile body 202 and the mobile body 204 are impossible. That is, in this case, according to the technique described in Japanese Patent No. 5695979, it is difficult to maintain communication among a plurality of mobile bodies forming an ad hoc network. Since the ad hoc network is divided, it is difficult to restore the communication.

To solve the above-described problem, according to an aspect of the present disclosure, an autonomous mobile robot includes a drive unit that drives the autonomous mobile robot, a control unit that outputs, to the drive unit, a first control command to move the autonomous mobile robot by a first control amount indicating any one of a pair consisting of a first movement distance and a first movement direction, a pair consisting of a first absolute velocity value and a first velocity direction, and a pair consisting of a first absolute acceleration value and a first acceleration direction, a communication unit that receives predetermined information transmitted from at least one communication target device that differs from the autonomous mobile robot and that forms a network with the autonomous mobile robot, a detection unit that detects the communication target device, and a direction identifying unit that identifies a direction in which the communication target device detected by the detection unit is positioned. Upon detecting that the predetermined information is no longer received by the communication unit, the control unit determines a second control amount by which the autonomous mobile robot is to be moved in the direction identified by the direction identifying unit and which indicates any one of a pair consisting of a second movement distance and a second movement direction, a pair consisting of a second absolute velocity value and a second velocity direction, and a pair consisting of a second absolute acceleration value and a second acceleration direction, and the control unit generates a second control command to switch the first control amount to the second control amount and move the autonomous mobile robot and outputs the generated second control command to the drive unit.

According to such a configuration, the first control command is output to the drive unit. The first control command is a command to move the autonomous mobile robot by a first control amount indicating any one of a pair consisting of a first movement distance and a first movement direction, a pair consisting of a first absolute velocity value and a first velocity direction, and a pair consisting of a first absolute acceleration value and a first acceleration direction. The predetermined information transmitted is received from at least one communication target device that differs from the autonomous mobile robot and that forms a network with the autonomous mobile robot. The communication target device is detected. Thereafter, the direction in which the communication target device detected by the detection unit is positioned is identified. Upon detecting that the predetermined information is no longer received by the communication unit, a second control amount is determined, where the autonomous mobile robot is to be moved by the second control amount in the direction identified by the direction identifying unit, and the second control amount indicates any one of a pair consisting of a second movement distance and a second movement direction, a pair consisting of a second absolute velocity value and a second velocity direction, and a pair consisting of a second absolute acceleration value and a second acceleration direction. A second control command is generated to switch the first control amount to the second control amount and move the autonomous mobile robot and is output to the drive unit.

Consequently, even when the communication between the autonomous mobile robot and the communication target device forming the network with the autonomous mobile robot is lost, the autonomous mobile robot can move closer to the autonomous mobile robot and, thus, the communication between the autonomous mobile robot and the communication target device can be restored.

The autonomous mobile robot described above may further include an image capture unit that captures the still or moving image of the surrounding area around the autonomous mobile robot. The detection unit may detect a communication target image indicating the communication target device in the still or moving image captured by the image capture unit, and the direction identifying unit may identify the direction in which the communication target device is positioned by using the position of the communication target image in the still or moving image.

According to such a configuration, the still or moving image of the surrounding area around the autonomous mobile robot is captured. The communication target image indicating the communication target device is detected in the captured still or moving image. From the position of the communication target image in the still or moving image, the direction in which the communication target device is positioned is identified.

Consequently, if the predetermined information transmitted from the communication target device is no longer received, a communication target image indicating the communication target device is detected from the captured still or moving image of the surrounding area around the autonomous mobile robot. In addition, from the position of the communication target image in the still or moving image, the direction in which the communication target device is positioned is identified. As a result, the direction in which the communication target device is positioned can be easily and reliably identified.

In the above-described autonomous mobile robot, if the control unit detects that the predetermined information is no longer received by the communication unit, the detection unit may detect the communication target image in the still or moving image captured by the image capture unit.

According to such a configuration, if it is detected that the predetermined information is no longer received, the communication target image is detected from the captured still or moving image. In this manner, since the communication target image is detected from the most recent still or moving image captured when it is detected that the predetermined information from the communication target device is no longer received, the autonomous mobile robot can more reliably move closer to the communication target device.

The autonomous mobile robot described above may further include a storage unit that stores the still or moving image captured by the image capture unit from the beginning of a predetermined time period until the current time. If the control unit detects that the predetermined information is no longer received by the communication unit, the detection unit may detect the communication target image in the still or moving images captured in the past and stored in the storage unit, and the direction identifying unit may estimate a direction in which the communication target device is currently positioned by using the position of the detected communication target image.

According to such a configuration, the still or moving images captured from the beginning of a predetermined time period until the current time are stored in the storage unit. If it is detected that the predetermined information is no longer received, the communication target image is detected from the still or moving images captured in the past and stored in the storage unit. From the position of the detected communication target image, the direction in which the communication target device is currently positioned is estimated.

Consequently, even when it is difficult to detect the communication target image in the most recent still or moving image captured when it is detected that the predetermined information is no longer received from the communication target device, the communication target image can be detected from the still image or moving image captured in the past and stored in the storage unit and, thus, the direction in which the communication target device is currently positioned can be estimated.

In the autonomous mobile robot described above, the at least one communication target device may comprise a plurality of communication target autonomous mobile robots, and the direction identifying unit may identify a direction in which among the communication target autonomous mobile robots, the one detected first by the detection unit is positioned.

According to such a configuration, the at least one communication target device comprise a plurality of communication target autonomous mobile robots. The direction in which among the communication target autonomous mobile robots, the one detected first by the detection unit is positioned is identified.

Consequently, if a plurality of communication target autonomous mobile robots are positioned in the surrounding area, the autonomous mobile robot moves toward the communication target autonomous mobile robot detected first. As a result, one of the plurality of communication target autonomous mobile robots can be easily selected.

In the autonomous mobile robot described above, the at least one communication target device may comprise a plurality of communication target autonomous mobile robots. The detection unit may detect the plurality of communication target autonomous mobile robots, and the direction identifying unit may identify a direction in which among the communication target autonomous mobile robots, the one selected at random by the detection unit is positioned.

According to such a configuration, the at least one communication target device comprises a plurality of communication target autonomous mobile robots. The communication target autonomous mobile robots are detected. The direction in which among the detected communication target autonomous mobile robots, the one selected at random is positioned is identified.

In this manner, if a plurality of the communication target autonomous mobile robots are positioned in the surrounding area, the autonomous mobile robot moves toward the communication target autonomous mobile robot selected at random among the plurality of detected autonomous mobile robots. Consequently, one of the plurality of communication target autonomous mobile robots can be easily selected.

In the autonomous mobile robot described above, the at least one communication target device may comprise a plurality of communication target autonomous mobile robots each having a predetermined priority. The detection unit may detect the plurality of communication target autonomous mobile robots, and the direction identifying unit may identify a direction in which among the communication target autonomous mobile robots, the one having the highest priority is positioned.

According to such configuration, the at least one communication target device comprises a plurality of communication target autonomous mobile robots each having a predetermined priority. The communication target autonomous mobile robots are detected. A direction in which among the communication target autonomous mobile robots, the one having the highest priority is positioned is identified.

In this way, if a plurality of communication target autonomous mobile robots are positioned in the surrounding area, the autonomous mobile robot moves toward the communication target autonomous mobile robot having the highest priority. Consequently, one of the plurality of the communication target autonomous mobile robots can be easily selected.

In the autonomous mobile robot described above, the at least one communication target device may comprise a plurality of communication target autonomous mobile robots. The detection unit may detect the plurality of communication target autonomous mobile robots. The autonomous mobile robot may further include a distance calculating unit that calculates a distance between the autonomous mobile robot and each of the communication target autonomous mobile robots, and the direction identifying unit may identify a direction in which among the communication target autonomous mobile robots, the one closest to the autonomous mobile robot is positioned.

According to such a configuration, the at least one communication target device comprise a plurality of communication target autonomous mobile robots. A plurality of communication target autonomous mobile robots are detected. The distance between the autonomous mobile robot and each of the communication target autonomous mobile robots is calculated. A direction in which among the communication target autonomous mobile robots, the one closest to the autonomous mobile robot is positioned is identified.

If a plurality of communication target autonomous mobile robots are positioned in the surrounding area, the autonomous mobile robot moves toward the autonomous mobile robot closest to the autonomous mobile robot. Consequently, one of the plurality of communication target autonomous mobile robots can be easily selected.

The autonomous mobile robot described above may further include a speed calculating unit that calculates the moving speed of the one of the communication target autonomous mobile robots. If the control unit detects that the predetermined information is no longer received by the communication unit, the control unit may determine the second control amount that causes the autonomous mobile robot to move in the direction identified by the direction identifying unit at a speed higher than the speed calculated by the speed calculating unit.

According to such a configuration, the speed at which the communication target autonomous mobile robot moves is calculated. If it is detected that the predetermined information is no longer received, a second control amount that causes the autonomous mobile robot to move in the identified direction at a speed higher than the calculated speed is determined.

In this manner, the autonomous mobile robot moves at a speed higher than the moving speed of the communication target autonomous mobile robot. Consequently, even when the communication target autonomous mobile robot is moving in a direction away from the autonomous mobile robot, the autonomous mobile robot can move closer to the communication target autonomous mobile robot.

According to another aspect of the present disclosure, a movement control method includes outputting a first control command to move an autonomous mobile robot by a first control amount indicating any one of a pair consisting of a first movement distance and a first movement direction, a pair consisting of a first absolute velocity value and a first velocity direction, and a pair consisting of a first absolute acceleration value and a first acceleration direction, receiving predetermined information transmitted from at least one communication target device that differs from the autonomous mobile robot and that forms a network with the autonomous mobile robot, detecting the communication target device, identifying a direction in which the detected communication target device is positioned, determining a second control amount by which the autonomous mobile robot is to be moved in the identified direction and which indicates any one of a pair consisting of a second movement distance and a second movement direction, a pair consisting of a second absolute velocity value and a second velocity direction, and a pair consisting of a second absolute acceleration value and a second acceleration direction upon detecting that the predetermined information is no longer received, and generating and outputting a second control command to switch the first control amount to the second control amount and move the autonomous mobile robot.

According to such a configuration, the first control command is output. The first control command is a command to move the autonomous mobile robot by the first control amount indicating any one of a pair consisting of a first movement distance and a first movement direction, a pair consisting of a first absolute velocity value and a first velocity direction, and a pair consisting of a first absolute acceleration value and a first acceleration direction. The predetermined information transmitted from the communication target device which differs from the autonomous mobile robot and which forms a network with the autonomous mobile robot is received. The communication target device is detected, and the direction in which the detected communication target device is positioned is identified. Thereafter, if it is detected that the predetermined information is no longer received, the second control amount by which the autonomous mobile robot is to be moved in the identified direction is determined. The second control amount indicates any one of a pair consisting of a second movement distance and a second movement direction, a pair consisting of a second absolute velocity value and a second velocity direction, and a pair consisting of a second absolute acceleration value and a second acceleration direction. A second control command to switch the first control amount to the second control amount and move the autonomous mobile robot is generated and output.

Consequently, even when the communication between the autonomous mobile robot and the communication target device that forms a network with the autonomous mobile robot is lost, the autonomous mobile robot can move closer to the communication target device and, thus, the communication between the autonomous mobile robot and the communication target device can be restored.

According to still another aspect of the present disclosure, a movement control program causes a computer to function as a control unit that outputs a first control command to move the autonomous mobile robot by a first control amount indicating any one of a pair consisting of a first movement distance and a first movement direction, a pair consisting of a first absolute velocity value and a first velocity direction, and a pair consisting of a first absolute acceleration value and a first acceleration direction and a direction identifying unit that identifies a direction in which a communication target device that differs from the autonomous mobile robot and that forms a network with the autonomous mobile robot is positioned. Upon detecting that predetermined information transmitted from the communication target device is no longer received, the control unit determines a second control amount by which the autonomous mobile robot is to be moved in the direction identified by the direction identifying unit and which indicates any one of a pair consisting of a second movement distance and a second movement direction, a pair consisting of a second absolute velocity value and a second velocity direction, and a pair consisting of a second absolute acceleration value and a second acceleration direction. Thereafter, the control unit generates and outputs a second control command to switch the first control amount to the second control amount and move the autonomous mobile robot.

According to such a configuration, a first control command is output to the drive unit. The first control command is a command to move the autonomous mobile robot by a first control amount indicating any one of a pair consisting of a first movement distance and a first movement direction, a pair consisting of a first absolute velocity value and a first velocity direction, and a pair consisting of a first absolute acceleration value and a first acceleration direction. A direction in which a communication target device that differs from the autonomous mobile robot and that forms a network with the autonomous mobile robot is positioned is identified. Thereafter, if it is detected that predetermined information transmitted from the communication target device is no longer received, a second control amount used to move the autonomous mobile robot in the identified direction is determined. The second control amount indicates any one of a pair consisting of a second movement distance and a second movement direction, a pair consisting of a second absolute velocity value and a second velocity direction, and a pair consisting of a second absolute acceleration value and a second acceleration direction. A second control command to switch the first control amount to the second control amount and moves the autonomous mobile robot is generated and is output to the drive unit.

Consequently, even when the communication between the autonomous mobile robot and the communication target device forming a network with the autonomous mobile robot is lost, the autonomous mobile robot can move closer to the autonomous mobile robot and, thus, the communication between the autonomous mobile robot and the communication target device can be restored.

According to yet still another aspect of the present disclosure, a system includes a communication target device and an autonomous mobile robot that autonomously moves while communicating with the communication target device. The communication target device includes a communication unit that transmits predetermined information to the autonomous mobile robot. The autonomous mobile robot includes a drive unit that drives the autonomous mobile robot, a control unit that outputs, to the drive unit, a first control command to move the autonomous mobile robot by a first control amount indicating any one of a pair consisting of a first movement distance and a first movement direction, a pair consisting of a first absolute velocity value and a first velocity direction, and a pair consisting of a first absolute acceleration value and a first acceleration direction, a communication unit that receives the predetermined information transmitted from the communication target device, a detection unit that detects the communication target device, and a direction identifying unit that identifies a direction in which the communication target device detected by the detection unit is positioned. Upon detecting that the predetermined information is no longer received by the communication unit, the control unit determines a second control amount by which the autonomous mobile robot is to be moved in the direction identified by the direction identifying unit and which indicates any one of a pair consisting of a second movement distance and a second movement direction, a pair consisting of a second absolute velocity value and a second velocity direction, and a pair consisting of a second absolute acceleration value and a second acceleration direction. The control unit generates a second control command to switch the first control amount to the second control amount and move the autonomous mobile robot and outputs the generated second control command to the drive unit.

According to such a configuration, the communication target device transmits the predetermined information to the autonomous mobile robot. The autonomous mobile robot outputs a first control command to the drive unit. The first control command is a command to move the autonomous mobile robot by the first control amount indicating any one of a pair consisting of a first movement distance and a first movement direction, a pair consisting of a first absolute velocity value and a first velocity direction, and a pair consisting of a first absolute acceleration value and a first acceleration direction. The predetermined information transmitted from the communication target device is received. The communication target device is detected. Thereafter, the direction in which the detected communication target device is positioned is identified. Subsequently, if it is detected that the predetermined information is no longer received, a second control amount by which the autonomous mobile robot is to be moved in the identified direction is determined. The second control amount indicates any one of a pair consisting of a second movement distance and a second movement direction, a pair consisting of a second absolute velocity value and a second velocity direction, and a pair consisting of a second absolute acceleration value and a second acceleration direction. A second control command to switch the first control amount to the second control amount and move the autonomous mobile robot is generated and is output to the drive unit.

Consequently, even when the communication between the autonomous mobile robot and the communication target device that forms a network with the autonomous mobile robot is lost, the autonomous mobile robot can move closer to the communication target device and, thus, the communication between the autonomous mobile robot and the communication target device can be restored.

In the example described above, some of a plurality of mobile bodies that form an ad hoc network are too far from other mobile bodies and, thus, communication among some or all of the mobile bodies is lost. As a result, the ad hoc network is divided. However, this is one of the examples of communication disruption among the mobile bodies, and communication disruption among the mobile bodies may occur due to a variety of other reasons, such as malfunction of some of mobile bodies that form the ad hoc network. The cause of communication disruption between mobile bodies that occurs in the exemplary embodiment described below is merely an example and is not intended to limit the present disclosure.

Note that each of the embodiments described below is a specific example of the present disclosure. A value, a shape, a constituent element, steps, and the sequence of steps described in the embodiments are only examples and shall not be construed as limiting the scope of the present disclosure. In addition, among the constituent elements in the embodiments described below, the constituent element that does not appear in an independent claim, which has the broadest scope, is described as an optional constituent element. In addition, in all of the embodiments, the constituent elements and the operations can be combined in any way.

Exemplary Embodiment

Figure 4:
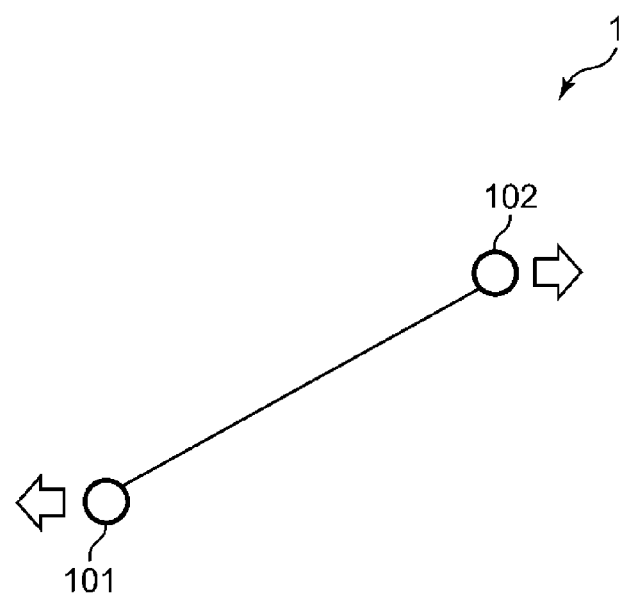
FIG. 4 is a conceptual diagram illustrating an entire ad hoc network including a plurality of mobile bodies according to an exemplary embodiment of the present disclosure.

FIG. 4 is a conceptual diagram illustrating an entire ad hoc network including a plurality of mobile bodies according to an exemplary embodiment of the present disclosure.

As illustrated in FIG. 4, an ad hoc network 1 includes mobile bodies 101 and 102 having communication capabilities. A solid line extending between circles representing the mobile bodies indicates that direct communication is possible between these mobile bodies. In the ad hoc network illustrated in FIG. 4 and the subsequent figures, each of the mobile bodies is represented by a circle, and a solid line extending between the circles indicates that direct communication is possible between the mobile bodies.

The mobile body 101 and the mobile body 102 can directly communicate with each other.

In addition, each of the mobile bodies 101 and 102 is moving in any direction. In FIG. 4, white arrows indicate the movement directions of the respective mobile bodies. In the subsequent figures, the movement direction of a mobile body is indicated by using such a white arrow.

FIG. 4 illustrates a horizontal two-dimensional plane viewed in a direction opposite to the direction of gravitational force, where the right hand side of FIG. 4 is east, the left hand side is west, the upper side is north, and the lower side is south. In the drawings of the present disclosure, a plan view illustrating mobile bodies forming an ad hoc network is a view of a horizontal two-dimensional plane in a direction opposite to the direction of gravitational force, and the right hand side of the plan view is east, the left hand side is west, the upper side is north, and the lower side is south, unless expressively specified otherwise. For simplicity, in FIG. 4, the mobile body is moving in a two-dimensional plane. However, according to the present disclosure, the movement of a mobile body is not limited to the movement of the mobile body in a two-dimensional plane. It should be appreciated that the present disclosure is applicable to a mobile body moving in three-dimensional space.

The mobile body has a variety of forms. Particular examples of the mobile body having a communication capability include a drone (an unmanned aerial vehicle) having a communication capability, an autonomous robot having a communication capability, a vehicle having a communication capability and operated by a human, a cleaning robot having a communication capability, and a human who carries a communication device. According to the present exemplary embodiment, the mobile bodies 101 and 102 are unmanned aerial vehicles.

The functional configuration and the overall operation performed by the mobile bodies 101 and 102 are described in detail below. The mobile body 101 is an example of an autonomous mobile robot, and the mobile body 102 is an example of a communication target autonomous mobile robot and an example of a communication target device. The mobile body 101 and the mobile body 102 have the same configuration. Note that if some of the functional configurations or the operations of the mobile body 101 are the same as those of the mobile body 102, description is given for only the mobile body 101, and description for the mobile body 102 is not repeated.

Figure 5:
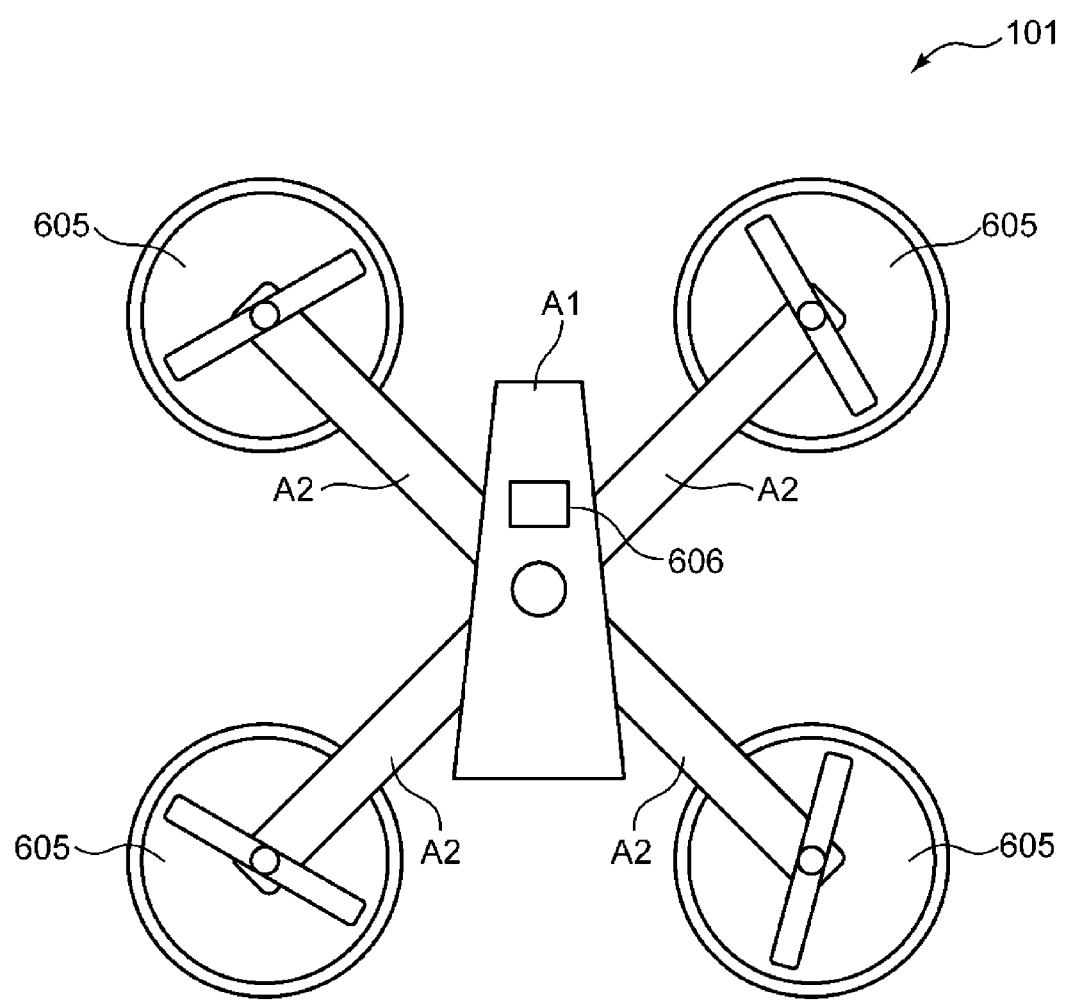
FIG. 5 is an external view of a mobile body according to the exemplary embodiment of the present disclosure.
Figure 6:
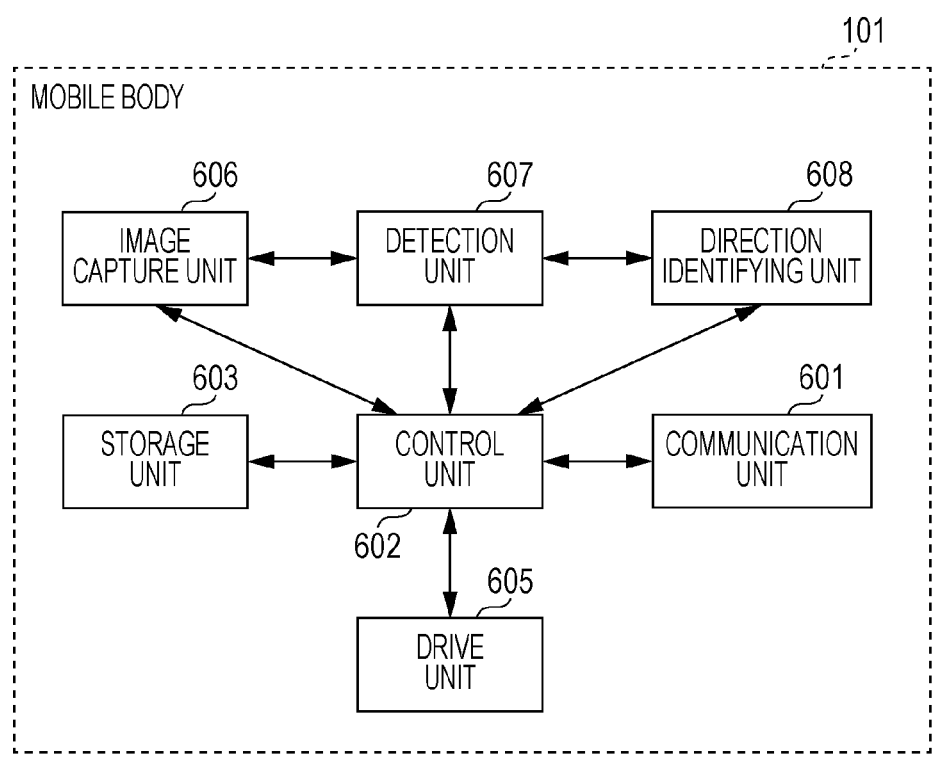
FIG. 6 is a block diagram illustrating the functional configuration of the mobile body according to the embodiment of the present disclosure.

FIG. 5 is an external view of the mobile body 101 according to the exemplary embodiment of the present disclosure. FIG. 6 is a block diagram illustrating the functional configuration of the mobile body 101 according to the embodiment of the present disclosure. The same numbering is used in referring to FIGS. 5 and 6 as is utilized above in describing FIG. 4, and description of the same constituent element is not repeated.

As illustrated in FIG. 5, the mobile body (an autonomous mobile robot) 101 includes a main body A1 and drive units 605 that generate a propulsion force which moves the mobile body 101. Each of the drive units 605 is attached to the top end of one of supporting portions A2 extending from the main body A1 in four directions. An image capture unit 606 is attached to the upper section of the main body A1. In addition, the main body A1 includes a communication unit 601, a control unit 602, a storage unit 603, a detection unit 607, and a direction identifying unit 608.

As illustrated in FIG. 6, the mobile body 101 includes the communication unit 601, the control unit 602, the storage unit 603, the drive units 605, the image capture unit 606, the detection unit 607, and the direction identifying unit 608.

The communication unit 601 communicates with other mobile bodies (communication target autonomous mobile robots and communication target devices) by using a communication technology, such as Wi-Fi, and transmits and receives information. In addition, the communication unit 601 relays communication between other mobile bodies.

The control unit 602 controls the communication unit 601, the storage unit 603, the drive unit 605, the image capture unit 606, the detection unit 607, and the direction identifying unit 608.

The storage unit 603 stores its own information (information regarding the storage unit 603 itself) and another mobile body's information (information regarding another mobile body) sent from the mobile body. The information stored in the storage unit 603 is described in more detail below with reference to FIGS. 7, 8, and 9.

Each of the drive units 605 receives an instruction from the control unit 602 and controls the movement of the mobile body 101. More specifically, the drive unit 605 includes a propeller and a motor that rotates the propeller. In FIG. 5, the mobile body 101 includes four drive units 605. However, the configuration of the mobile body 101 is not limited thereto. For example, the mobile body 101 may include five or more drive units 605. The control unit 602 controls the movement direction or the flight state of the mobile body 101 by appropriately controlling the rotational speed of the propeller of each of the drive units 605. That is, the drive units 605 drive the mobile body 101.

The control unit 602 outputs a first control command to the drive unit 605 so that the mobile body 101 moves in accordance with a first control amount. The first control amount indicates any one of a pair consisting of a first movement distance and a first movement direction, a pair consisting of a first absolute velocity value and a first velocity direction, and a pair consisting of a first absolute acceleration value and a first acceleration direction.

The communication unit 601 receives predetermined information transmitted from a communication target mobile body that differs from the mobile body 101 and that forms a network together with the mobile body 101 (for example, the mobile body 102).

The image capture unit 606 captures the image around the mobile body 101 as a still image or a moving image.

The detection unit 607 detects the communication target mobile body (the mobile body 102). Upon detecting that predetermined information is no longer received by the communication unit 601, the detection unit 607 detects a mobile body image (a communication target image) representing the mobile body 102 (the communication target mobile body) from the still or moving image captured by the image capture unit 606.

The direction identifying unit 608 identifies the direction in which the communication target mobile body (the mobile body 102) detected by the detection unit 607 is positioned. Upon detecting that predetermined information is no longer received by the communication unit 601, the direction identifying unit 608 determines, from the position of the mobile body image in the still or moving image captured by the image capture unit 606, the direction in which the mobile body 102 is positioned.

Upon detecting that the predetermined information is no longer received by the communication unit 601, the control unit 602 determines a second control amount by which the control unit 602 moves the mobile body 101 in the direction identified by the direction identifying unit 608. The second control amount indicates any one of a pair consisting of a second movement distance and a second movement direction, a pair consisting of a second absolute velocity value and a second velocity direction, and a pair consisting of a second absolute acceleration value and a second acceleration direction. The control unit 602 generates a second control command to switch the first control amount to the second control amount and move the mobile body 101. Thereafter, the control unit 602 outputs the generated second control command to the drive units 605.

FIG. 7 illustrates an example of information stored in the storage unit 603 of the mobile body 101 according to the exemplary embodiment of the present disclosure. The same numbering is used in referring to FIG. 7 as is utilized above in describing FIGS. 4 and 6, and description of the same constituent element is not repeated.

The storage unit 603 stores mobile body information 701 which is information regarding the mobile body 101 itself and another mobile body's information 702 which is information regarding another mobile body forming the ad hoc network 1.

The mobile body information 701 includes mobile body identification information used to uniquely identify the mobile body information 701 itself, the first control amount, and the second control amount. The first control amount indicates any one of the pair consisting of the first movement distance and the first movement direction, the pair consisting of the first absolute velocity value and the first velocity direction, and the pair consisting of the first absolute acceleration value and the first acceleration direction. The second control amount indicates any one of the pair consisting of the second movement distance and the second movement direction, the pair consisting of the second absolute velocity value and the second velocity direction, and the pair consisting of the second absolute acceleration value and the second acceleration direction. The second control amount is used to move the mobile body 101 in the direction identified by the direction identifying unit 608 upon detecting that the predetermined information sent from the mobile body 102 is no longer received by the communication unit 601.

The mobile body information 702 includes mobile body identification information used to uniquely identify the another mobile body.

While the present exemplary embodiment has been described with reference to its own mobile body information 701 and another mobile body's information 702 each including the mobile body identification information, the present disclosure is not limited thereto. The mobile body information 701 and the mobile body information 702 need not always include mobile body identification information.

FIG. 8 illustrates an example of the mobile body information 701 regarding the mobile body 101 stored in the storage unit 603 of the mobile body 101 according to the exemplary embodiment of the present disclosure. The same numbering is used in referring to FIG. 8 as is utilized above in describing FIGS. 4 and 7, and description of the same constituent element is not repeated.

The mobile body 101 stores the mobile body information 701 regarding the mobile body 101 itself in the storage unit 603 in, for example, the format illustrated in FIG. 8. The mobile body information 701 includes mobile body identification information used to uniquely identify the mobile body information 701 itself, the first control amount, and the second control amount. The first control amount indicates any one of a pair consisting of a first movement distance and a first movement direction, a pair consisting of a first absolute velocity value and a first velocity direction, and a pair consisting of a first absolute acceleration value and a first acceleration direction. The second control amount indicates any one of a pair consisting of a second moving distance and a second movement direction, a pair consisting of a second absolute speed value and the second speed direction, and a pair consisting of the second absolute acceleration value and the second absolute acceleration direction by which the mobile body 101 is moved in the direction identified by the direction identifying unit 608 upon detecting that the predetermined information sent from the mobile body 102 is no longer received by communication unit 601.

The mobile body information 701 illustrated in FIG. 8 indicates that the value of the mobile body identification information thereof is "mobile body 101", the value of the first control amount is "(−5 m/s, 0 m/s, 0 m/s)", and the value of the second control amount is "(0 m/s, 0 m/s, 0 m/s)".

In FIG. 8, the first control amount is represented by a pair consisting of the first absolute speed value and the first speed direction. The unit is meters per second (m/s). The values are expressed by using an orthogonal coordinate system with x-axis, y-axis, and z-axis, where positive x-axis represents east, positive y-axis represents north, and positive z-axis represents a direction opposite to the direction of gravitational force. It is to be appreciated that the first control amount can be any one of a pair consisting of a first movement distance and a first movement direction, a pair consisting of a first absolute velocity value and a first velocity direction, and a pair consisting of a first absolute acceleration value and a first acceleration direction or any combinations thereof. Alternatively, these values may be expressed in a different way. For example, the first control amount may be expressed by a difference in latitude per unit time, a difference in longitude per unit time, and a difference in sea level altitude per unit time. Hereinafter, the first control amount is represented by a pair consisting of the first absolute speed value and the first speed direction, unless expressly specified otherwise. The unit is meters per second (m/s), and the values are expressed by using an orthogonal coordinate system with x-axis, y-axis, and the z-axis, where positive x-axis represents east, positive y-axis represents north, and positive z-axis represents a direction opposite to the direction of gravitational force.

In addition, in FIG. 8, the second control amount is represented by a pair consisting of the second absolute speed value and the second speed direction. The unit is meters per second (m/s). The values are expressed by using an orthogonal coordinate system with x-axis, y-axis, and z-axis, where positive x-axis represents east, positive y-axis represents north, and positive z-axis represents a direction opposite to the direction of gravitational force, It is to be appreciated that the second control amount can be any one of a pair consisting of a second movement distance and a second movement direction, a pair consisting of a second absolute velocity value and a second velocity direction, and a pair consisting of a second absolute acceleration value and a second acceleration direction or combinations thereof. In addition, these values may be expressed in a different way. For example, the second control amount may be expressed by a difference in latitude per unit time, a difference in longitude per unit time, and a difference in sea level altitude per unit time. Hereinafter, the second control amount is represented by a pair consisting of the second absolute speed value and the second speed direction, unless expressly specified otherwise. The unit is meters per second (m/s), and the values are expressed by using an orthogonal coordinate system with x-axis, y-axis, and the z-axis, where positive x-axis represents east, positive y-axis represents north, and positive z-axis represents a direction opposite to the direction of gravitational force.

Note that the first control amount is a control amount expressing the movement of the mobile body to achieve its original purpose.

Figure 9:
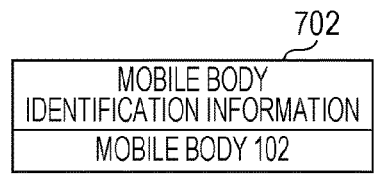
FIG. 9 illustrates an example of another mobile body's information stored in the storage unit of the mobile body according to the embodiment of the present disclosure.

FIG. 9 illustrates an example of the another mobile body's information 702 stored in the storage unit 603 of the mobile body 101 according to the embodiment of the present disclosure. The same numbering is used in referring to FIG. 9 as is utilized above in describing FIGS. 4 and 7, and description of the same constituent element is not repeated.

The mobile body 101 stores the another mobile body's information 702 in the storage unit 603 in, for example, the format illustrated in FIG. 9. The another mobile body's information 702 includes mobile body identification information used to uniquely identify the another mobile body.

The another mobile body's information 702 illustrated in FIG. 9 indicates that the value of the mobile body identification information of the mobile body 102 is "mobile body 102". In this example, only one mobile body (the mobile body 102) forms the ad hoc network 1 together with the mobile body 101. However, a plurality of mobile bodies may form the ad hoc network 1 together with the mobile body 101. In such a case, the another mobile body's information 702 includes a plurality of pieces of mobile body identification information of a plurality of other mobile bodies.

The control unit 602 generates a first control command for moving the mobile body 101 by the first control amount and outputs the first control command to the drive units 605. The drive units 605 actually move the mobile body 101 according to the first control command. In addition, the control unit 602 generates a second control command for moving the mobile body 101 by the second control amount and outputs the second control command to the drive units 605. The drive units 605 actually move the mobile body 101 according to the second control command.

Figure 10:
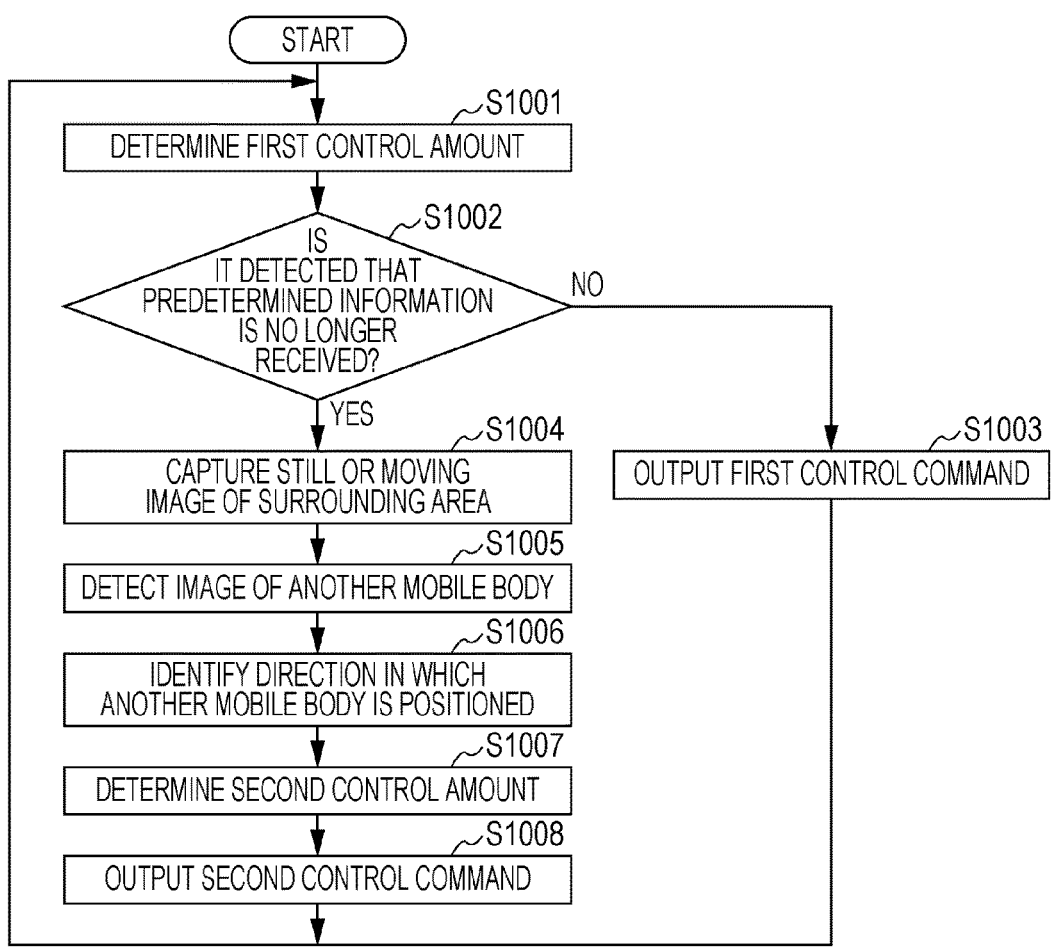
FIG. 10 is a flowchart illustrating the overall operation for controlling the movement of the mobile body according to the exemplary embodiment of the present disclosure.

FIG. 10 is a flowchart illustrating the overall operation for controlling the movement of the mobile body 101 according to the exemplary embodiment of the present disclosure.

The control unit 602 of the mobile body 101 determines the first control amount by which the mobile body 101 is to be moved in order to achieve a predetermined task and updates the first control amount in the mobile body information 701 regarding the mobile body 101 first (step S1001).

Figure 11:
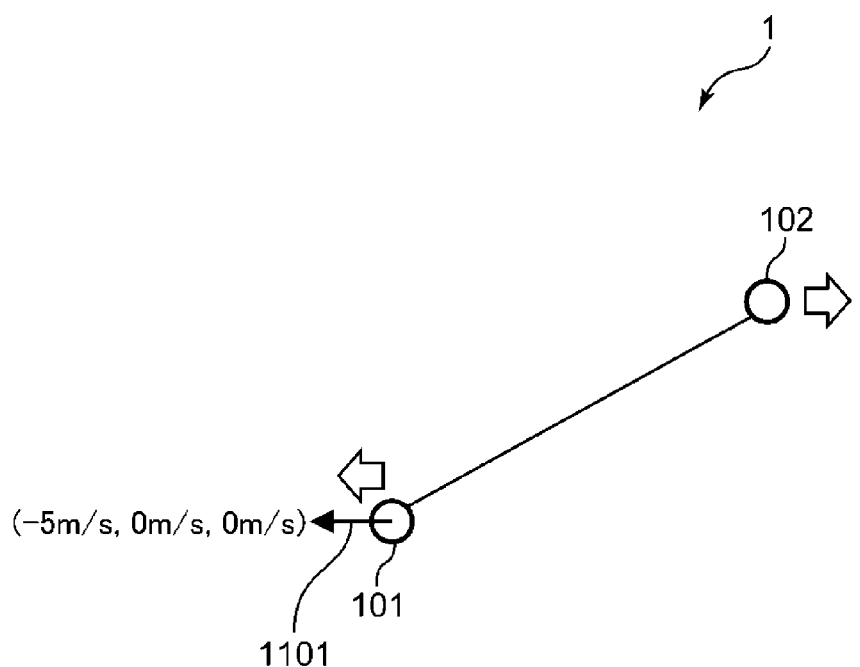
FIG. 11 is a conceptual diagram illustrating an example of a first control amount according to the exemplary embodiment of the present disclosure.

FIG. 11 is a conceptual diagram illustrating an example of the first control amount according to the exemplary embodiment of the present disclosure. The same numbering is used in referring to FIG. 11 as is utilized above in describing FIG. 4, and description of the same constituent element is not repeated.

In the scene illustrated in FIG. 11, it is best that the mobile body 101 is moved west at a speed of 5 m/s in order to achieve its original purpose. In this case, a first control amount 1101 is (−5 m/s, 0 m/s, 0 m/s).

Subsequently, the control unit 602 of the mobile body 101 determines whether predetermined information is no longer received (step S1002).

The communication unit 601 of the mobile body 101 requests all other mobile bodies to transmit the mobile body identification information (predetermined information) via the ad hoc network and receives the mobile body identification information. Thereafter, the control unit 602 of the mobile body 101 updates the mobile body identification information in the mobile body information 702. If the mobile body identification information cannot be received from another mobile body whose mobile body identification information is recorded in the another mobile body's information 702, the control unit 602 of the mobile body 101 determines that the mobile body is one of the other mobile bodies that cannot communicate with the mobile body 101 and detects that predetermined information is not received from the mobile body. The communication unit 601 may periodically request all other mobile bodies to transmit the mobile body identification information (predetermined information) via the ad hoc network.

According to the present exemplary embodiment, the control unit 602 determines whether it has detected that the mobile body identification information from another mobile body has not been received. However, the present disclosure is not limited to such determination. For example, the control unit 602 may detect whether a signal output in response to the signal sent to another mobile body is no longer received. That is, the information transmitted and received between the mobile body 101 and the mobile body 102 need not be the mobile body identification information. Any information may be transmitted and received between the mobile body 101 and the mobile body 102 if the mobile body 101 can determine whether the mobile body 101 and the mobile body 102 can directly communicate with each other.

If the control unit 602 of the mobile body 101 does not detect that predetermined information is no longer received (NO in step S1002), the control unit 602 of the mobile body 101 transmits the first control command to the drive units 605 in order to move the mobile body 101 by the first control amount (step S1003). Thereafter, the processing returns to step S1001. The drive units 605 actually move the mobile body 101 according to the first control command input from the control unit 602.

For example, in the scene illustrated in FIG. 11, since the mobile body 101 can communicate with the mobile body 102 and there are no mobile bodies with which the mobile body 101 cannot communicate, the control unit 602 of the mobile body 101 transmits the first control command to the drive unit 605 in order to move the mobile body 101 by the first control amount. Thereafter, the processing returns to step S1001.

However, if the control unit 602 detects that the predetermined information is no longer received (YES in step S1002), the image capture unit 606 of the mobile body 101 captures the image of the surrounding area around the mobile body 101 as a still or moving image (step S1004). Note that when the image capture unit 606 captures only the image of the area in the movement direction of the mobile body 101, the mobile body 101 itself may rotate 360 degrees in the horizontal plane to capture a still or moving image around the mobile body 101. Alternatively, the image capture unit 606 itself may rotate 360 degrees in the horizontal plane to capture a still or moving image around the mobile body 101. Still alternatively, the image capture unit 606 may capture a 360-degree still or moving image around the mobile body 101 by using a plurality of cameras. Yet still alternatively, the image capture unit 606 may be an all-sky camera capable of capturing a 360-degree image around the mobile body 101.

Subsequently, the detection unit 607 of the mobile body 101 detects an image indicating the mobile body 102 from the still or moving image captured by the image capture unit 606 (step S1005).

Figure 12:
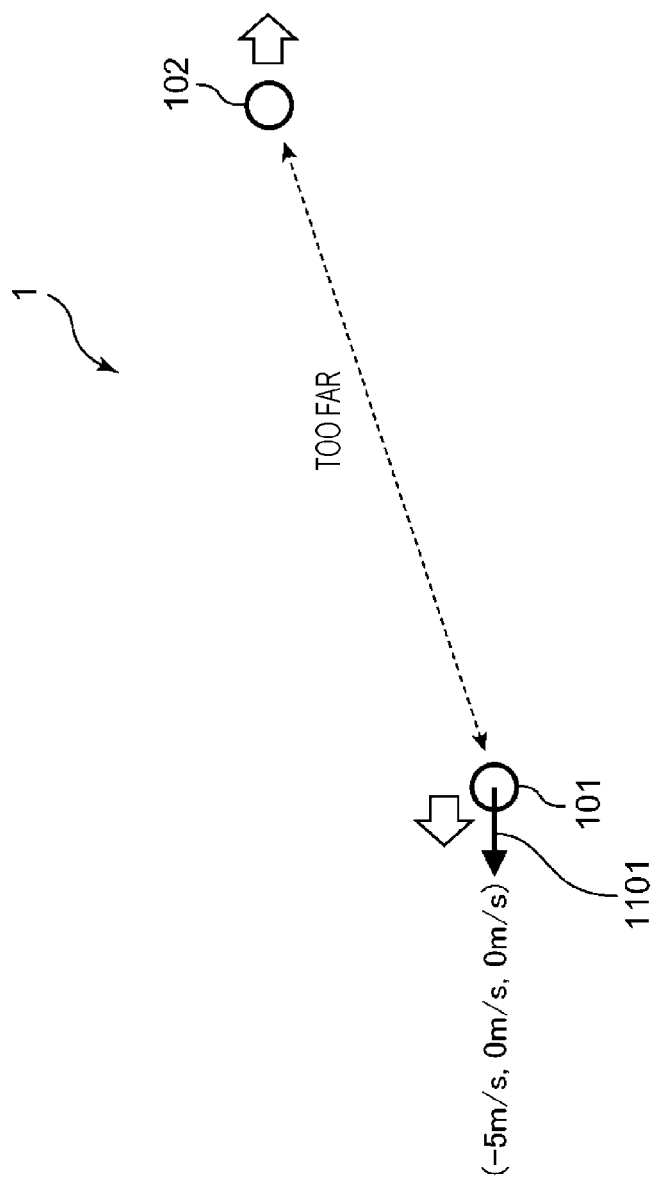
FIG. 12 is a conceptual diagram illustrating an entire ad hoc network including a plurality of mobile bodies in the case where another mobile body is too far from the mobile body according to the exemplary embodiment of the present disclosure.

FIG. 12 is a conceptual diagram illustrating an entire ad hoc network formed by a plurality of mobile bodies in the case where the another mobile body 102 is too far away according to the exemplary embodiment of the present disclosure. The same numbering is used in referring to FIG. 12 as is utilized above in describing FIGS. 4 and 11, and description of the same constituent element is not repeated.

As illustrated in FIG. 12, since the mobile body 101 and the mobile body 102 are moving away from each other, the distance therebetween is too great and, thus, the direct communication is lost. Therefore, in step S1002, it is determined that the predetermined information is no longer received, and the detection unit 607 of the mobile body 101 detects an image indicating the another mobile body 102 in the still or moving image captured by the image capture unit 606. For example, the detection unit 607 detects an image indicating the another mobile body 102 in the still or moving image captured by the image capture unit 606 by using an image recognition technique.

To facilitate the detection of an image indicating the another mobile body 102, the mobile body 102 may place a marker on the surface of the body thereof for easy detection, and the detection unit 607 may analyze the still or moving image captured by the image capture unit 606 to detect an image indicating the marker of the mobile body 102. Note that in addition to the mobile body 102 having a marker thereon, the mobile body 101 may have a marker on the surface of the body thereof.

Furthermore, to facilitate the detection of the image of the mobile body 102, the mobile body 102 may include a light emitting unit that transmits an optical signal, and the detection unit 607 of the mobile body 101 may detect the optical signal output from the mobile body 102 in the still or moving image captured by the image capture unit 606. The optical signal is generated by, for example, flashing light at predetermined intervals. The optical signal may include mobile body identification information. Note that in addition to the mobile body 102, the mobile body 101 may include a light emitting unit that emits an optical signal.

Subsequently, the direction identifying unit 608 of the mobile body 101 identifies the direction in which the mobile body 102 is positioned from the position of the image detected by the detection unit 607 in the still or moving image captured by the image capture unit 606 (step S1006).

The direction can be expressed by, for example, a clockwise degree measure of an angle from the movement direction of the mobile body 101 (0 degrees) when viewed in the direction opposite to the direction of gravitational force.

In the case where a marker is attached to the mobile body 102, the direction identifying unit 608 may identify the direction in which the mobile body 102 is positioned from the position of the marker detected by the detection unit 607.

Subsequently, the control unit 602 of the mobile body 101 determines the second control amount by which the mobile body 101 is to be moved in the direction identified by the direction identifying unit 608. Thereafter, the control unit 602 updates the second control amount in the mobile body information 701 regarding the mobile body 101 itself (step S1007).

Subsequently, the control unit 602 of the mobile body 101 generates a second control command to switch the first control amount to the second control amount and move the mobile body 101. Thereafter, the control unit 602 outputs the generated second control command to the drive units 605 (step S1008). The processing returns to step S1001. The drive units 605 actually move the mobile body 101 according to the second control command input from the control unit 602.

Figure 13:
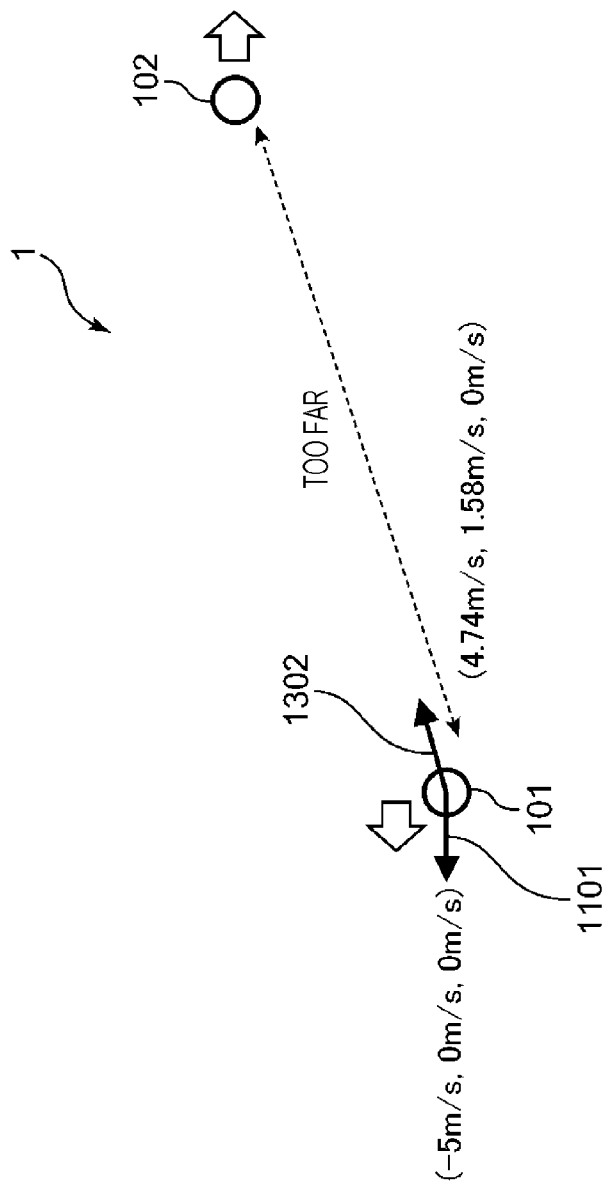
FIG. 13 is a conceptual diagram illustrating an example of a second control amount according to the exemplary embodiment of the present disclosure.

FIG. 13 is a conceptual diagram illustrating an example of the second control amount according to the exemplary embodiment of the present disclosure. The same numbering is used in referring to FIG. 13 as is utilized above in describing FIGS. 4, 11, and 12, and description of the same constituent element is not repeated.

In this example, a second control amount 1302 is represented by a constant speed of 5 m/s at which the mobile body 101 is moved in the direction identified by the direction identifying unit 608.

In the scene illustrated in FIG. 13, since the mobile body 101 need to move at a constant speed of 5 m/s in the direction identified by the direction identifying unit 608 (the direction in which the mobile body 102 is located), the second control amount 1302 is set to (4.74 m/s, 1.58 m/s, 0 m/s).

Figure 14:
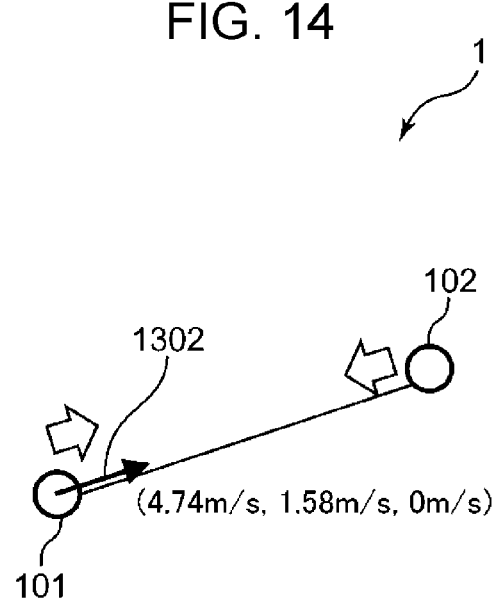
FIG. 14 is a conceptual diagram illustrating an entire ad hoc network including a plurality of mobile bodies when communication between the mobile body and the another mobile body is restored according to the exemplary embodiment of the present disclosure.

FIG. 14 is a conceptual diagram illustrating an entire ad hoc network including a plurality of mobile bodies when communication between the mobile body 101 and the mobile body 102 is restored according to the exemplary embodiment of the present disclosure. The same numbering is used in referring to FIG. 14 as is utilized above in describing FIGS. 4, 11, 12, and 13, and description of the same constituent element is not repeated.

In the scene illustrated in FIG. 14, the mobile body 101 is moving toward the mobile body 102 according to the second control command output to the drive units 605 in the scene illustrated in FIG. 13. In addition, if the technique described in the exemplary embodiment of the present disclosure is applied to the mobile body 102, the mobile body 102 moves toward the mobile body 101. Accordingly, since the mobile body 101 and the other mobile bodies 102 move closer to each other, the distance between the mobile body 101 and the mobile body 102 decreases. Thus, the direct communication between the mobile body 101 and the mobile body 102 is restored.

The mobile body 101 may include a transmission unit that transmits a first signal (e.g., a light ray or sound) having a directionality toward the another mobile body 102. Upon receiving the first signal, the mobile body 102 may transmit a second signal (e.g., a light ray or sound) to the mobile body 101. The detection unit 607 of the mobile body 101 is, for example, a reception unit. The detection unit 607 may receive the second signal (e.g., a light ray or sound) transmitted from the mobile body 102. The direction identifying unit 608 of the mobile body 101 may identify the direction in which the mobile body 102 is positioned by identifying the transmission direction of the first signal transmitted immediately before reception of the second signal from the mobile body 102.

In addition, the control unit 602 of the mobile body 101 may identify the distance to the mobile body 102, the relative speed, and the relative acceleration by using the time period from the transmission of the first signal until the reception of the second signal. If the communication with the mobile body 102 is lost, the mobile body 101 can restore the communication with the mobile body 102 by identifying the direction in which the mobile body 102 is positioned, the distance to the mobile body 102, the relative speed with respect to the mobile body 102, and the relative acceleration with respect to the mobile body 102 and moving closer to the mobile body 102 in an appropriate direction and at an appropriate speed and acceleration. In this manner, even when the mobile body 102 is moving in an unexpected direction, the mobile body 101 can perform its operation to move closer to the mobile body 102 in accordance with the direction in which the mobile body 102 is located and the distance, the relative speed, and the relative acceleration of the mobile body 102.

Modifications of the present exemplary embodiment is described below. According to the above-described exemplary embodiment, the ad hoc network includes two mobile bodies. According to the present modification of the exemplary embodiment, an ad hoc network includes three mobile bodies.

Figure 15:
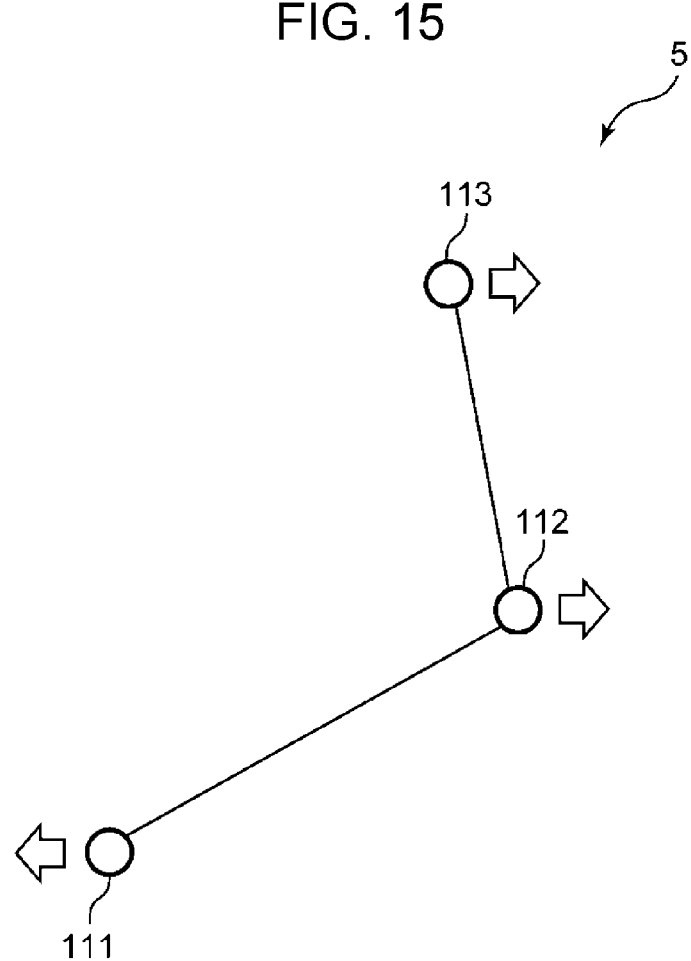
FIG. 15 is a conceptual diagram illustrating an entire ad hoc network including a plurality of mobile bodies according to a first modification of the exemplary embodiment of the present disclosure.

FIG. 15 is a conceptual diagram illustrating an entire ad hoc network including a plurality of mobile bodies according to a first modification of the exemplary embodiment of the present disclosure.

As illustrated in FIG. 15, an ad hoc network 5 includes a first mobile body 111, a second mobile body 112, and a third mobile body 113 each having a communication capability. The configurations of the first mobile body 111, the second mobile body 112, and the third mobile body 113 are the same as that of the mobile body 101 described above. The first mobile body 111 and the second mobile body 112 can directly communicate with each other. The second mobile body 112 and the third mobile body 113 can directly communicate with each other. In addition, the first mobile body 111 and the third mobile body 113 can indirectly communicate with each other via the second mobile body 112.

In addition, the first mobile body 111, the second mobile body 112, and the third mobile body 113 are moving in any directions. In FIG. 15, the first mobile body 111 is moving to the left (west), the second mobile body 112 is moving to the right (east), and the third mobile body 113 is moving to the right (east).

Figure 16:
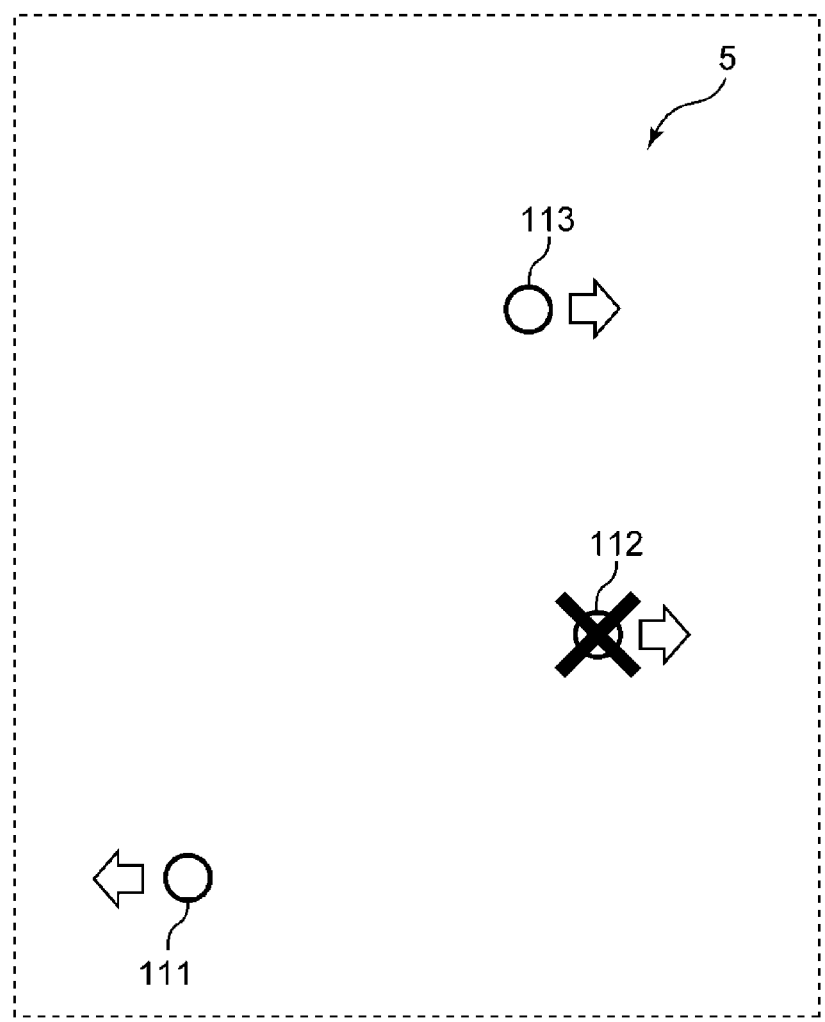
FIG. 16 is a conceptual diagram illustrating the entire ad hoc network including a plurality of mobile bodies in the case where the communication capability of a second mobile body malfunctions according to the first modification of the exemplary embodiment of the present disclosure.

FIG. 16 is a conceptual diagram illustrating the entire ad hoc network including a plurality of mobile bodies in the case where the communication capability of the second mobile body 112 malfunctions according to the first modification of the exemplary embodiment of the present disclosure. The same numbering is used in referring to FIG. 16 as is utilized above in describing FIG. 15, and description of the same constituent element is not repeated. Note that an X mark given on a circle indicating a mobile body indicates that the communication capability of the mobile body malfunctions. The same applies to the subsequent figures illustrating an ad hoc network.

As illustrated in FIG. 16, since the communication capability of the second mobile body 112 malfunctions, the direct communication between the first mobile body 111 and the second mobile body 112 is lost. In addition, the direct communication between the second mobile body 112 and the third mobile body 113 is lost. In this case, the control unit 602 of the first mobile body 111 detects that the predetermined information is no longer received. Accordingly, the image capture unit 606 of the first mobile body 111 captures the still or moving image of the surrounding area of the first mobile body 111. Similarly, the control unit 602 of the third mobile body 113 detects that the predetermined information is no longer received. Thus, the image capture unit 606 of the third mobile body 113 captures the still or moving image of the surrounding area of the third mobile body 113.

Figure 17:
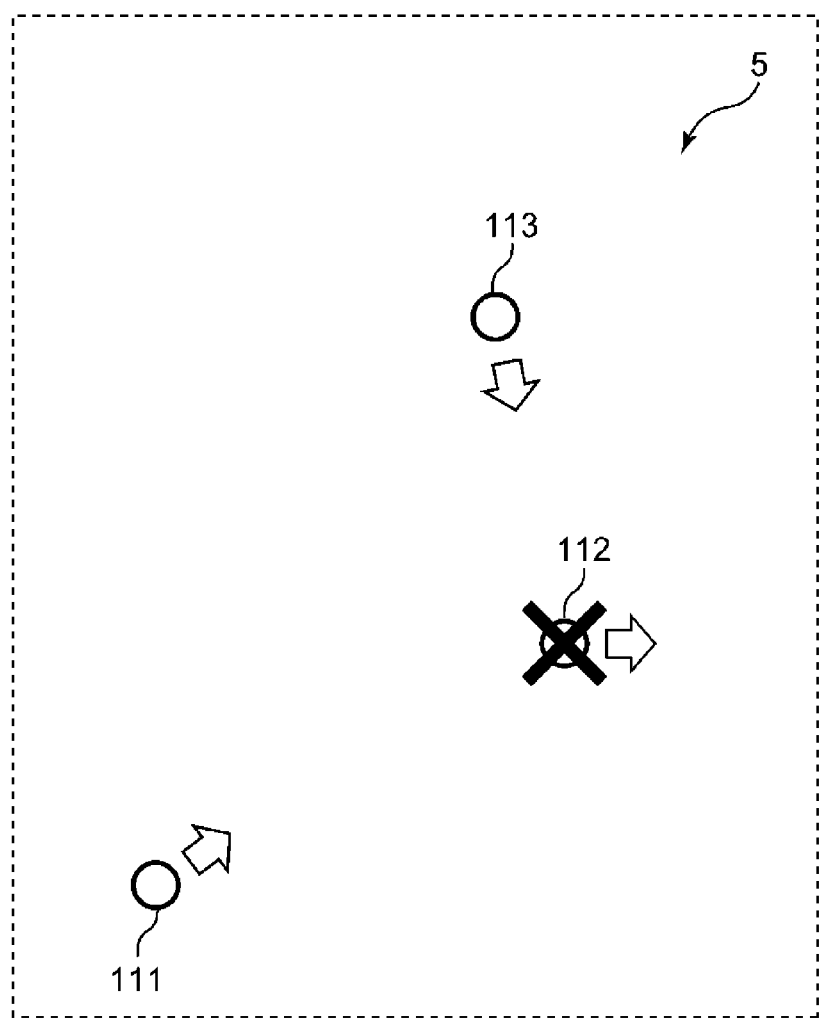
FIG. 17 is a conceptual diagram illustrating the entire ad hoc network including a plurality of mobile bodies in the case where both a first mobile body and a third mobile body detect a second mobile body according to the first modification of the exemplary embodiment of the present disclosure.

FIG. 17 is a conceptual diagram illustrating the entire ad hoc network including a plurality of mobile bodies in the case where both the first mobile body 111 and the third mobile body 113 detect the second mobile body 112 according to the first modification of the exemplary embodiment of the present disclosure. The same numbering is used in referring to FIG. 17 as is utilized above in describing FIGS. 15 and 16, and description of the same constituent element is not repeated.

The detection unit 607 of the first mobile body 111 detects an image indicating the second mobile body 112 in the still or moving image captured by the image capture unit 606. Similarly, the detection unit 607 of the third mobile body 113 detects an image indicating the second mobile body 112 in the still or moving image captured by the image capture unit 606.

The direction identifying unit 608 of the first mobile body 111 identifies the direction in which the second mobile body 112 is positioned from the position of the image indicating the second mobile body 112 in the still or moving image captured by the image capture unit 606. In addition, the direction identifying unit 608 of the third mobile body 113 identifies the direction in which the second mobile body 112 is positioned from the position of the image indicating the second mobile body 112 in the still or moving image captured by the image capture unit 606.

At this time, the direction identifying unit 608 of the first mobile body 111 identifies the direction in which among the plurality of communication target mobile bodies, a communication target mobile body detected first is positioned. That is, the direction identifying unit 608 of the first mobile body 111 identifies a direction in which a communication target mobile body is positioned by using, among the plurality of communication target mobile bodies (the second mobile body 112 and the third mobile body 113), the position of the image indicating the communication target mobile body detected first. In the example illustrated in FIG. 17, because the direction identifying unit 608 of the first mobile body 111 detects the image indicating the second mobile body 112 first out of the second mobile body 112 and the third mobile body 113, the direction identifying unit 608 identifies the direction in which the second mobile body 112 is positioned.

Similarly, the direction identifying unit 608 of the third mobile body 113 identifies the direction in which a communication target mobile body detected first is positioned among the plurality of communication target mobile bodies. That is, the direction identifying unit 608 of the third mobile body 113 identifies a direction in which a communication target mobile body is positioned by using, among the plurality of communication target mobile bodies (the first mobile body 111 and the second mobile body 112), the position of the image indicating the communication target mobile body detected first. In the example illustrated in FIG. 17, because the direction identifying unit 608 of the third mobile body 113 detects the image indicating the second mobile body 112 first out of the first mobile body 111 and the second mobile body 112, the direction identifying unit 608 identifies the direction in which the second mobile body 112 is positioned.

As a result, as illustrated in FIG. 17, the first mobile body 111 starts moving in the direction identified by the direction identifying unit 608 (i.e., the direction in which the second mobile body 112 is positioned). In addition, the third mobile body 113 starts moving in the direction identified by the direction identifying unit 608 (i.e., the direction in which the second mobile body 112 is positioned).

Figure 18:
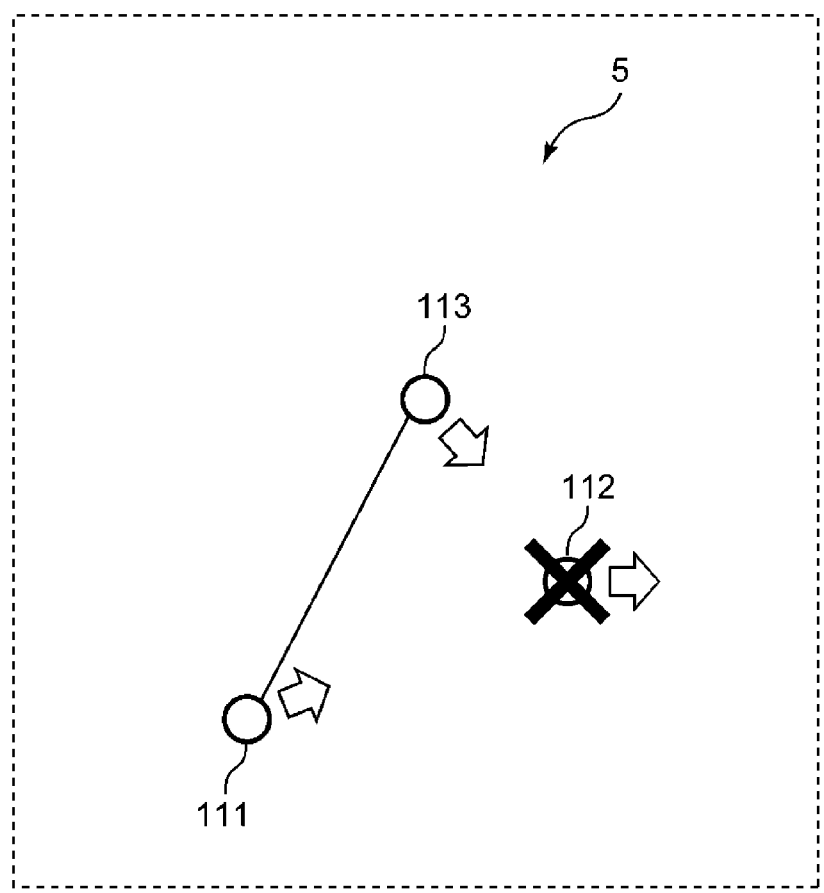
FIG. 18 is a conceptual diagram illustrating the entire ad hoc network including a plurality of mobile bodies in the case where communication between the first mobile body and the third mobile body is restored according to the first modification of the exemplary embodiment of the present disclosure.

FIG. 18 is a conceptual diagram illustrating the entire ad hoc network including a plurality of mobile bodies in the case where communication between the first mobile body 111 and the third mobile body 113 is restored according to the first modification of the exemplary embodiment of the present disclosure. The same numbering is used in referring to FIG. 18 as is utilized above in describing FIGS. 15, 16, and 17, and description of the same constituent element is not repeated.

In the scene illustrated in FIG. 18, the first mobile body 111 moves toward the second mobile body 112, and the third mobile body 113 moves toward the second mobile body 112. As a result, the first mobile body 111 and the third mobile body 113 are located in the vicinity of the second mobile body 112 and, thus, the first mobile body 111 and the third mobile body 113 are located closer to each other. As a result, the distance between the first mobile body 111 and the third mobile body 113 decreases and, thus, the direct communication between the first mobile body 111 and the third mobile body 113 is restored.

According to the first modification of the exemplary embodiment of the present disclosure, if the communication capability of the second mobile body 112 malfunctions, both of the first mobile body 111 and the third mobile body 113 move toward the second mobile body 112. In this manner, direct communication between the first mobile body 111 and the third mobile body 113 is restored. However, according to a second modification of the exemplary embodiment of the present disclosure, the first mobile body 111 may move toward the third mobile body 113, and the third mobile body 113 may move toward the first mobile body 111. In this manner, direct communication between the first mobile body 111 and the third mobile body 113 may be restored.

Figure 19:
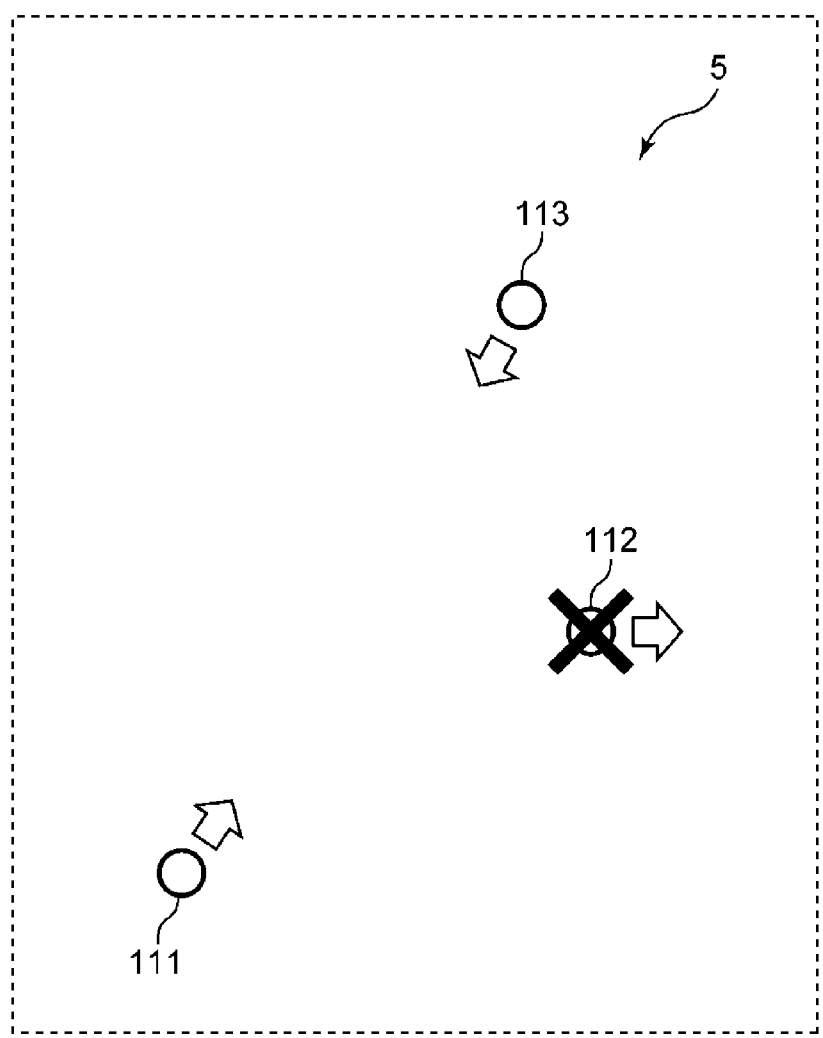
FIG. 19 is a conceptual diagram illustrating the entire ad hoc network including a plurality of mobile bodies in the case where the first mobile body detects the third mobile body while the third mobile body detects the first mobile body according to a second modification of the exemplary embodiment of the present disclosure.

FIG. 19 is a conceptual diagram illustrating the entire ad hoc network including a plurality of mobile bodies in the case where the first mobile body 111 detects the third mobile body 113 while the third mobile body 113 detects the first mobile body 111 according to the second modification of the exemplary embodiment of the present disclosure. The same numbering is used in referring to FIG. 19 as is utilized above in describing FIGS. 15 and 16, and description of the same constituent element is not repeated.

In the scene illustrated in FIG. 19, because the communication capability of the second mobile body 112 malfunctions, direct communication between the first mobile body 111 and the second mobile body 112 is lost and, in addition, direct communication between the second mobile body 112 and the third mobile body 113 is lost. In this case, the control unit 602 of the first mobile body 111 determines that the predetermined information is no longer received, and the image capture unit 606 of the first mobile body 111 captures the still or moving image of the surrounding area around the first mobile body 111. Similarly, the control unit 602 of the third mobile body 113 determines that the predetermined information is no longer received, and the image capture unit 606 of the third mobile body 113 captures the still or moving image of the surrounding area around the third mobile body 113.

The detection unit 607 of the first mobile body 111 detects a mobile body image indicating one of the second mobile body 112 and the third mobile body 113 in the still or moving image captured by the image capture unit 606. Similarly, the detection unit 607 of the third mobile body 113 detects a mobile body image indicating one of the first mobile body 111 and the second mobile body 112 in the still or moving image captured by the image capture unit 606.

In the example illustrated in FIG. 19, the detection unit 607 of the first mobile body 111 detects a mobile body image indicating the third mobile body 113 first out of the second mobile body 112 and the third mobile body 113. In addition, the detection unit 607 of the third mobile body 113 detects a mobile body image indicating the first mobile body 111 first out of the first mobile body 111 and the second mobile body 112.

Since the mobile body image indicating the third mobile body 113 is detected first out of the second mobile body 112 and the third mobile body 113, the direction identifying unit 608 of the first mobile body 111 identifies the direction in which the third mobile body 113 is positioned. Similarly, since the mobile body image indicating the first mobile body 111 is detected first out of the first mobile body 111 and the second mobile body 112, the direction identifying unit 608 of the third mobile body 113 identifies the direction in which the first mobile body 111 is positioned.

As a result, as illustrated in FIG. 19, the first mobile body 111 starts moving in the direction identified by the direction identifying unit 608 (the direction in which the third mobile body 113 is positioned), and the third mobile body 113 starts moving in the direction identified by the direction identifying unit 608 (the direction in which the first mobile body 111 is positioned).

Figure 20:
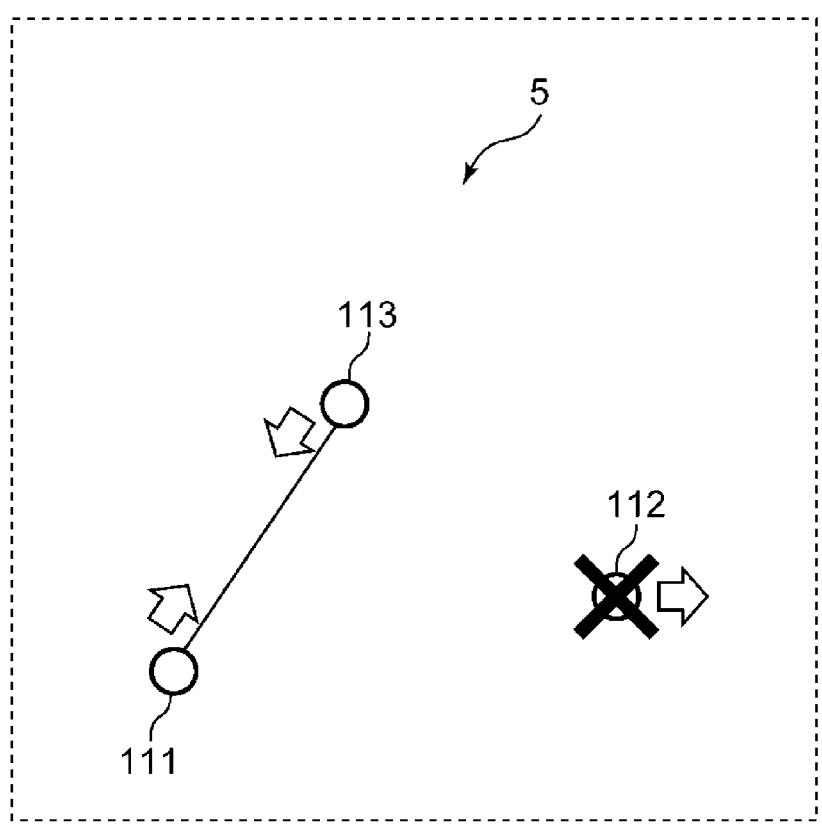
FIG. 20 is a conceptual diagram illustrating the entire ad hoc network including a plurality of mobile bodies in the case where communication between a first mobile body and a third mobile body is restored according to the second modification of the exemplary embodiment of the present disclosure.

FIG. 20 is a conceptual diagram illustrating the entire ad hoc network including a plurality of mobile bodies in the case where the communication between the first mobile body 111 and the third mobile body 113 is restored according to the second modification of the exemplary embodiment of the present disclosure. The same numbering is used in referring to FIG. 20 as is utilized above in describing FIGS. 15, 16, and 17, and description of the same constituent element is not repeated.

In the scene illustrated in FIG. 20, the first mobile body 111 moves toward the third mobile body 113, and the third mobile body 113 moves toward the first mobile body 111. Consequently, the first mobile body 111 and the third mobile body 113 move closer to each other. As a result, the distance between the first mobile body 111 and the third mobile body 113 decreases, and direct communication between the first mobile body 111 and the third mobile body 113 is restored.

According to the second modification of the exemplary embodiment of the present disclosure, the first mobile body 111 moves toward the third mobile body 113, and the third mobile body 113 moves toward the first mobile body 111. In this manner, the direct communication between the first mobile body 111 and the third mobile body 113 is restored. However, according to a third modification of the exemplary embodiment of the present disclosure, the first mobile body 111 moves toward the third mobile body 113, and the third mobile body 113 moves toward the second mobile body 112. In this manner, the direct communication of the first mobile body 111 and the third mobile body 113 may be restored.

Figure 21:
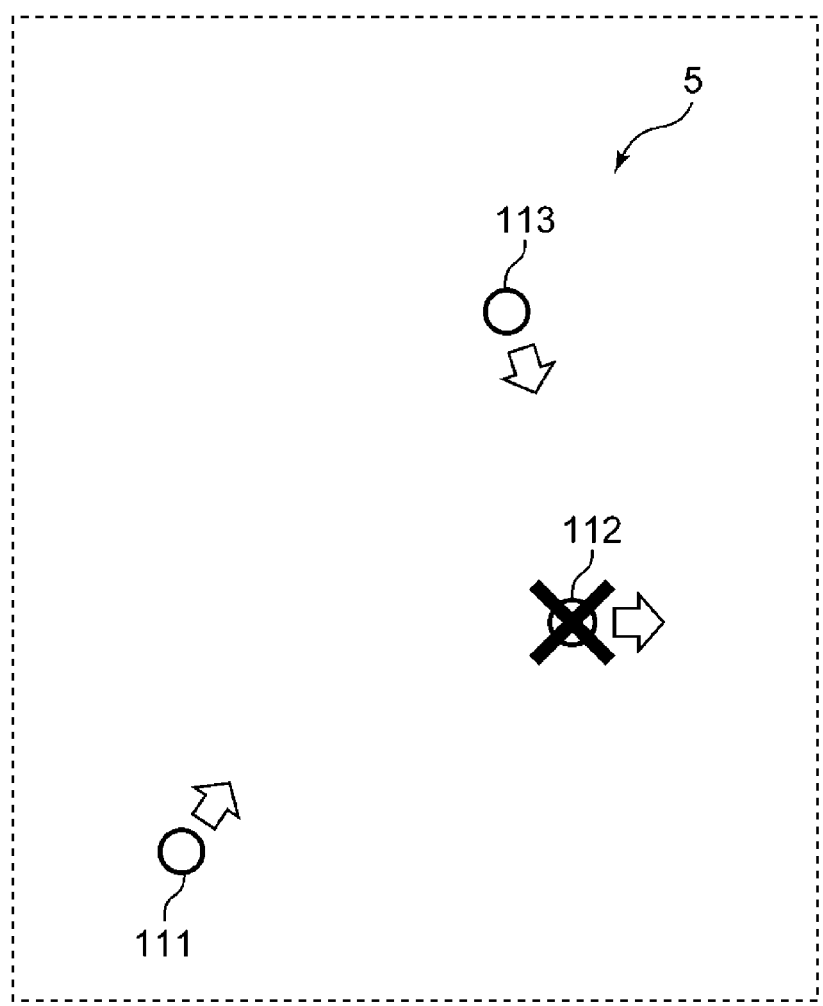
FIG. 21 is a conceptual diagram illustrating the entire ad hoc network including a plurality of mobile bodies in the case where a first mobile body detects a third mobile body while the third mobile body detects a second mobile body according to a third modification of the exemplary embodiment of the present disclosure.

FIG. 21 is a conceptual diagram illustrating the entire ad hoc network including a plurality of mobile bodies in the case where the first mobile body 111 detects the third mobile body 113 while the third mobile body 113 detects the second mobile body 112 according to the third modification of the exemplary embodiment of the present disclosure. The same numbering is used in referring to FIG. 21 as is utilized above in describing FIGS. 15 and 16, and description of the same constituent element is not repeated.

In the scene illustrated in FIG. 21, because the communication capability of the second mobile body 112 malfunctions, direct communication between the first mobile body 111 and the second mobile body 112 is lost, and direct communication between the second mobile body 112 and the third mobile body 113 is lost. In this case, the control unit 602 of the first mobile body 111 determines that the predetermined information is no longer received, and the image capture unit 606 of the first mobile body 111 captures the still or moving image of the surrounding area around the first mobile body 111. Similarly, the control unit 602 of the third mobile body 113 determines that the predetermined information is no longer received, and the image capture unit 606 of the third mobile body 113 captures the still or moving image of the surrounding area around the third mobile body 113.

The detection unit 607 of the first mobile body 111 detects a mobile body image indicating one of the second mobile body 112 and the third mobile body 113 in the still or moving image captured by the image capture unit 606. Similarly, the detection unit 607 of the third mobile body 113 detects a mobile body image indicating one of the first mobile body 111 and the second mobile body 112 in the still or the moving image captured by the image capture unit 606.

In the example illustrated in FIG. 21, the detection unit 607 of the first mobile body 111 detects a mobile body image indicating the third mobile body 113 first out of the second mobile body 112 and the third mobile body 113. In addition, the detection unit 607 of the third mobile body 113 detects a mobile body image indicating the second mobile body 112 first out of the first mobile body 111 and the second mobile body 112.

Since out of the second mobile body 112 and the third mobile body 113, the image indicating the third mobile body 113 is detected first, the direction identifying unit 608 of the first mobile body 111 identifies the direction in which the third mobile body 113 is positioned. Similarly, since out of the first mobile body 111 and the second mobile body 112, the image indicating the second mobile body 112 is detected first, the direction identifying unit 608 of the third mobile body 113 identifies the direction in which the second mobile body 112 is positioned.

As a result, as illustrated in FIG. 21, the first mobile body 111 starts moving in the direction identified by the direction identifying unit 608 (the direction in which the third mobile body 113 is positioned), and the third mobile body 113 starts moving in the direction identified by the direction identifying unit 608 (the direction in which the second mobile body 112 is positioned).

Figure 22:
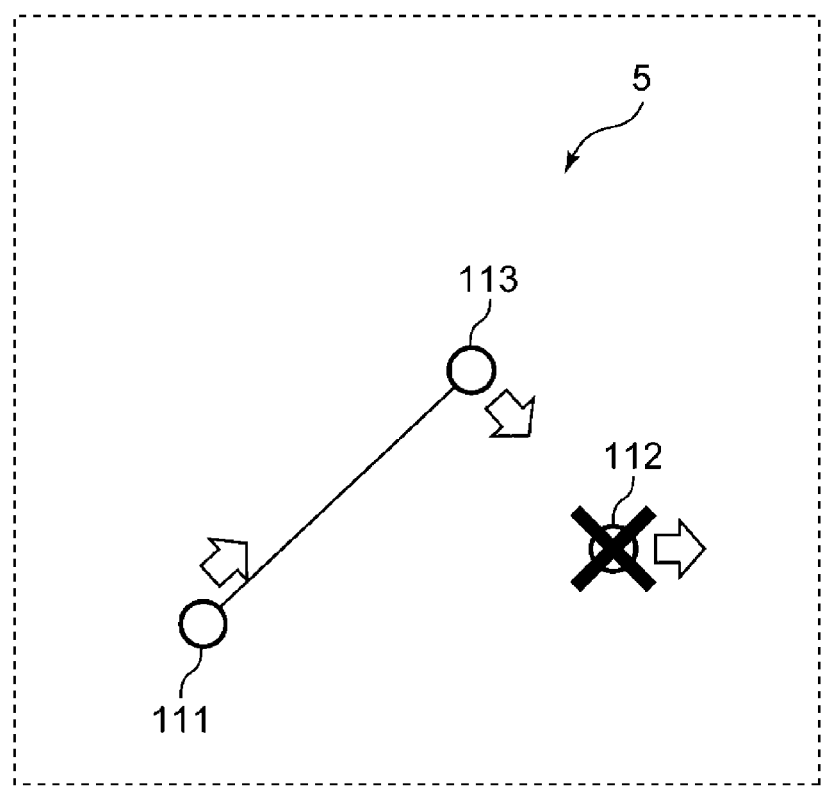
FIG. 22 is a conceptual diagram illustrating the entire ad hoc network including a plurality of mobile bodies in the case where communication between the first mobile body and the third mobile body is restored according to the third modification of the exemplary embodiment of the present disclosure.

FIG. 22 is a conceptual diagram illustrating the entire ad hoc network including a plurality of mobile bodies in the case where the communication between the first mobile body 111 and the third mobile body 113 is restored according to the third modification of the exemplary embodiment of the present disclosure. The same numbering is used in referring to FIG. 22 as is utilized above in describing FIGS. 15, 16, and 17, and description of the same constituent element is not repeated.

In the scene illustrated in FIG. 22, the first mobile body 111 moves toward the third mobile body 113, and the third mobile body 113 moves toward the second mobile body 112. Consequently, the first mobile body 111 and the third mobile body 113 move closer to each other. As a result, the distance between the first mobile body 111 and the third mobile body 113 decreases, and the direct communication between the first mobile body 111 and the third mobile body 113 is restored.

Note that, in the case where when a mobile body is directly communicating with a plurality of communication target mobile bodies, communication with some of the plurality of communication target mobile bodies is lost, it is desirable that the lost communication with the communication target mobile bodies be recovered while maintaining the communication with the communication target mobile bodies that is not lost. That is, when the first mobile body 111 directly communicating with each of the second mobile body 112 and the third mobile body 113 loses the communication with the second mobile body 112, the lost communication between the first mobile body 111 and the second mobile body 112 is restored while maintaining the communication between the first mobile body 111 and the third mobile body 113 that is not lost.

For example, if the first mobile body 111 communicating with the second mobile body 112 and the third mobile body 113 loses the communication with the second mobile body 112 but continues the communication with the third mobile body 113, the first mobile body 111 identifies the direction in which the second mobile body 112 is positioned by using a signal other than the radio wave used for communication. Thereafter, the first mobile body 111 moves closer to the second mobile body 112. At the same time, the first mobile body 111 transmits its position, speed, and acceleration to the third mobile body 113 to the third mobile body 113 and instructs the third mobile body 113 to follow the first mobile body 111 itself. The third mobile body 113 follows the first mobile body 111 in accordance with the instruction received from the first mobile body 111. Note that to identify the direction in which the second mobile body 112 is positioned, the first mobile body 111 may detect the second mobile body 112 by analyzing the image captured by the image capture unit 606 of the first mobile body 111, Alternatively, the first mobile body 111 may transmit and receive a signal having directionality (e.g., a light ray or sound).

While the present exemplary embodiment has been described with reference to the direction identifying unit 608 that identifies the direction in which among the plurality of communication target mobile bodies, the communication target mobile body detected first is positioned, the technique for identifying the direction is not limited thereto. When a plurality of communication target mobile bodies are detected by the detection unit 607, the direction identifying unit 608 may randomly select any one of the communication target mobile bodies and identify the direction in which the selected mobile body is positioned. That is, when a plurality of communication target mobile bodies are detected by the detection unit 607, the direction identifying unit 608 may randomly select any one of the communication target mobile bodies and identify the direction in which the communication target mobile body is positioned by using the position of the selected communication target mobile body.

When identifying the direction in which among the plurality of communication target mobile bodies, the communication target mobile body detected first is positioned, almost all of the mobile bodies may move in a certain direction. However, by identifying the direction in which a communication target mobile body randomly selected from among the plurality of communication target mobile body is positioned, the mobile bodies moves in a variety of directions and, thus, the plurality of mobile bodies can easily get gather. As used herein, the term "random selection" means selection made such that the probability of each of a plurality of communication target mobile bodies being selected is the same or substantially the same.

In addition, a predetermined priority order may be defined for a plurality of mobile bodies forming an ad hoc network, and a predetermined priority order may be defined for a plurality of communication target mobile bodies. The direction identifying unit 608 may identify the direction in which among the plurality of communication target mobile bodies, a communication target mobile body having the highest priority is positioned. That is, if a plurality of mobile body images are detected by the detection unit 607, the direction identifying unit 608 may identify the direction in which one of the plurality of the communication target mobile bodies is positioned by using the position of the mobile body image indicating the communication target mobile body having the highest priority.

For example, if a plurality of mobile bodies include a master mobile body that controls other mobile bodies and a slave mobile body that operates under the control of the master mobile body, the priority of the master mobile body is higher than that of the slave mobile body.

In this case, the storage unit 603 of the mobile body 101 may prestore the mobile body identification information used to uniquely identify each of the plurality of communication target mobile bodies forming the ad hoc network in association with their respective priorities. The direction identifying unit 608 may identify the priorities of the detected communication target mobile bodies on the basis of the mobile body identification information transmitted by using an optical signal from another communication target mobile body or the mobile body identification information identified by the marker provided on another mobile body. Thereafter, the direction identifying unit 608 may identify the direction in which the communication target mobile body having the highest priority is positioned.

In addition, the detection unit 607 may detect a plurality of communication target mobile bodies and calculate the distance between the mobile body including the detection unit 607 and each of the detected communication target mobile bodies. The direction identifying unit 608 may identify the direction in which among the detected communication target mobile bodies, the communication target mobile body closest to the mobile body including the detection unit 607 is positioned. That is, if a plurality of mobile body images are detected by the detection unit 607, the direction identifying unit 608 may identify the direction in which one of the communication target mobile bodies is positioned by using the position of the mobile body image indicating the communication target mobile body closest to the mobile body including the detection unit 607 among the plurality of mobile body images. Note that the distance between the mobile body including the detection unit 607 and a communication target mobile body can be calculated on the basis of the distance between the mobile body 101 and the another mobile body 102 described above.

Furthermore, according to the present exemplary embodiment, the control unit 602 of the mobile body 101 may calculate the moving speed of the one of the communication target mobile bodies. Upon detecting that the predetermined information is no longer received by the communication unit 601, the control unit 602 may determine the second control amount used to move the mobile body 101 at a speed higher than the calculated speed in a direction identified by the direction identifying unit 608. Note that the moving speed of the communication target mobile body can be calculated on the basis of the relative speed between the mobile body 101 and the another mobile body 102 described above.

According to the present exemplary embodiment, if it is detected by the control unit 602 that predetermined information is no longer received by the communication unit 601, the detection unit 607 detects a mobile body image in the still or moving image captured by the image capture unit 606. However, the present disclosure is not limited thereto. The storage unit 603 of the mobile body 101 may store still or moving images captured by the image capture unit 606 from the beginning of a predetermined time period until the current time. If the control unit 602 detects that the predetermined information is no longer received by the communication unit 601, the detection unit 607 may detect a mobile body image in the still or moving images stored in the storage unit 603 in the past. Furthermore, the direction identifying unit 608 may estimate the direction in which the communication target mobile body is currently positioned by using the position of the detected mobile body image. Note that the detection unit 607 may detect a mobile body image captured in the past and stored in the storage unit 603 in order from the most recent to the least recent still image or frame image.

For example, when communication with another mobile body is lost, the mobile body may be very far from the another mobile body and, thus, it may be difficult to detect the mobile body image in the captured still or moving image. In such a case, by detecting a mobile body image indicating the another mobile body in the still or moving image captured in the past, it is possible to estimate the direction in which the another mobile body is currently positioned.

In addition, according to the present exemplary embodiment, the direction identifying unit 608 identifies the direction in which another mobile body is positioned from the position of the mobile body image detected in the still or moving image captured by the image capture unit 606. However, the present disclosure is not limited to the identification technique. For example, a direction in which another mobile body is positioned may be identified from the position at which the sound output from the another mobile body is generated. Alternatively, other various method may be used to identify the direction in which the another mobile body is positioned.

Furthermore, while the present exemplary embodiment has been described with reference to the ad hoc network including the mobile body 101 and a communication target mobile body different from the mobile body 101 (for example, the mobile body 102), an ad hoc network of the present disclosure is not limited thereto. The present disclosure is applicable to a network including the mobile body 101 and the base station. That is, the communication target devices may include the base station forming a network with the mobile body 101. In this case, the communication unit 601 may receive predetermined information transmitted from the base station that differs from the mobile body 101 and that forms the network with the mobile body 101. The detection unit 607 may detect the base station. The direction identifying unit 608 may identify the direction in which the base station detected by the detection unit 607 is located. Note that a technique for detecting the base station is the same as the above-described technique for detecting the mobile body 102. In addition, the technique for identifying the direction in which the base station is located is the same as the above-described technique for identifying the direction in which the mobile body 102 is positioned.

Still furthermore, the present disclosure is applicable to a network formed by the mobile body 101 and a portable or mobile communication device. That is, the communication target devices may include a communication device that form a network with the mobile body 101. In this case, the communication unit 601 may receive predetermined information transmitted from a communication device that differs from the mobile body 101 and that forms the network with the mobile body 101. The detection unit 607 may detect the communication device. The direction identifying unit 608 may identify the direction in which the communication device detected by the detection unit 607 is positioned. Note that a technique for detecting the communication device is the same as the above-described technique for detecting the mobile body 102. In addition, a technique for identifying the direction in which the communication device is located is the same as the above-described technique for identifying the direction in which the mobile body 102 is positioned. Also note that the communication device may be a wireless controller used to control the mobile body 101.

According to the present disclosure, all or some of the units, devices, members or parts or all or some of the functional blocks of the block diagrams illustrated in the drawings may be a semiconductor device, a semiconductor integrated circuit (IC), or one or more electronic circuits including a large scale Integration (LSI). The LSI or IC may be integrated in one chip or may be formed by combining a plurality of chips. For example, the functional blocks other than memory elements may be integrated into one chip. The terms "LSI" and "IC" are used herein, but the term "system LSI", "Very Large Scale Integration (VLSI)", or "Ultra Large Scale Integration (VLSI)" may be used as well depending on the level of integration. In addition, a field programmable gate array (FPGA), which is programmable after fabrication of the LSI, or a reconfigurable logic device which allows reconfiguration of connections and settings of circuit cells in LSI may be used for the same purpose.

Furthermore, the functions or operations of all or some of the units, devices, members, or parts can be executed by software processing. In this case, the software is stored on one or more non-transitory recording media, such as ROMs, optical discs, or hard disc drives. When the software is executed by a processing unit (a processor), the function defined by the software is executed by the processing unit (the processor) and peripheral devices. The system or apparatus may include one or more non-transitory recording media on which software is stored, a processing unit (a processor), and a required hardware device (for example, an interface).

The autonomous mobile robot, the movement control method, the movement control program, and the system according to the present disclosure are effective as a system described below. That is, the system includes an autonomous mobile robot and a communication target device that forms a network with the autonomous mobile robot. Even when communication between the autonomous mobile robot and the communication target device is lost, the autonomous mobile robot is capable of autonomously moving closer to the communication target device so that the communication between the autonomous mobile robot and the communication target device is restored. Thus, the autonomous mobile robot can autonomously move while communicating with the communication target device. The system further includes a movement control method for controlling the movement of the autonomous mobile robot, a movement control program for controlling the movement of the autonomous mobile robot.

What is claimed is:
1. An autonomous mobile robot comprising:
a driver that drives the autonomous mobile robot;
a controller that outputs, to the driver, a first control command to move the autonomous mobile robot by a first control amount indicating any one of a pair consisting of a first movement distance and a first movement direction, a pair consisting of a first absolute velocity value and a first velocity direction, and a pair consisting of a first absolute acceleration value and a first acceleration direction;
a communicator that receives predetermined information transmitted from at least one communication target device that differs from the autonomous mobile robot and that forms a network with the autonomous mobile robot;
a detector that detects the communication target device; and
a direction identifier that identifies a direction in which the communication target device detected by the detector is positioned,
wherein upon detecting that the predetermined information is no longer received by the communicator, the controller determines a second control amount by which the autonomous mobile robot is to be moved in the direction identified by the direction identifier and which indicates any one of a pair consisting of a second movement distance and a second movement direction, a pair consisting of a second absolute velocity value and a second velocity direction, and a pair consisting of a second absolute acceleration value and a second acceleration direction, and
wherein the controller generates a second control command to switch the first control amount to the second control amount and move the autonomous mobile robot and outputs the generated second control command to the driver.

2. The autonomous mobile robot according to claim 1, further comprising:
an image capturer that captures a still or moving image of a surrounding area around the autonomous mobile robot,
wherein the detector detects a communication target image indicating the communication target device in the still or moving image captured by the image capturer, and
wherein the direction identifier identifies the direction in which the communication target device is positioned by using a position of the communication target image in the still or moving image.

3. The autonomous mobile robot according to claim 2, wherein if the controller detects that the predetermined information is no longer received by the communicator, the detector detects the communication target image in the still or moving image captured by the image capturer.

4. The autonomous mobile robot according to claim 2, further comprising:
a storage that stores the still or moving image captured by the image capturer from the beginning of a predetermined time period until the current time,
wherein if the controller detects that the predetermined information is no longer received by the communicator, the detector detects the communication target image in the still or moving images captured in the past and stored in the storage, and
wherein the direction identifier estimates a direction in which the communication target device is currently positioned by using the position of the detected communication target image.

5. The autonomous mobile robot according to claim 1, wherein the at least one communication target device comprises a plurality of communication target autonomous mobile robots, and
  wherein the direction identifier identifies a direction in which among the communication target autonomous mobile robots, the one detected first by the detector is positioned.

6. The autonomous mobile robot according to claim 1, wherein the at least one communication target device comprises a plurality of communication target autonomous mobile robots,
  wherein the detector detects the plurality of communication target autonomous mobile robots, and
  wherein the direction identifier identifies a direction in which among the communication target autonomous mobile robots, the one selected at random by the detector is positioned.

7. The autonomous mobile robot according to claim 1, wherein the at least one communication target device comprises a plurality of communication target autonomous mobile robots each having a predetermined priority,
  wherein the detector detects the plurality of communication target autonomous mobile robots, and
  wherein the direction identifier identifies a direction in which among the communication target autonomous mobile robots, the one having the highest priority is positioned.

8. The autonomous mobile robot according to claim 1, wherein the at least one communication target device comprises a plurality of communication target autonomous mobile robots,
  wherein the detector detects the plurality of communication target autonomous mobile robots,
  wherein the autonomous mobile robot further comprises a distance calculator that calculates a distance between the autonomous mobile robot and each of the communication target autonomous mobile robots, and
  wherein the direction identifier identifies a direction in which among the communication target autonomous mobile robots, the one closest to the autonomous mobile robot is positioned.

9. The autonomous mobile robot according to claim 5, further comprising:
  a speed calculator that calculates a moving speed of the one of the communication target autonomous mobile robots,
  wherein if the controller detects that the predetermined information is no longer received by the communicator, the controller determines the second control amount that causes the autonomous mobile robot to move in the direction identified by the direction identifier at a speed higher than the speed calculated by the speed calculator.

10. A movement control method comprising:
  outputting a first control command to move an autonomous mobile robot by a first control amount indicating any one of a pair consisting of a first movement distance and a first movement direction, a pair consisting of a first absolute velocity value and a first velocity direction, and a pair consisting of a first absolute acceleration value and a first acceleration direction;
  receiving predetermined information transmitted from at least one communication target device that differs from the autonomous mobile robot and that forms a network with the autonomous mobile robot;
  detecting the communication target device;
  identifying a direction in which the detected communication target device is positioned;
  determining a second control amount by which the autonomous mobile robot is to be moved in the identified direction and which indicates any one of a pair consisting of a second movement distance and a second movement direction, a pair consisting of a second absolute velocity value and a second velocity direction, and a pair consisting of a second absolute acceleration value and a second acceleration direction upon detecting that the predetermined information is no longer received; and
  generating and outputting a second control command to switch the first control amount to the second control amount and move the autonomous mobile robot.

11. A non-transitory computer-readable recording medium storing a program, which when executed by a computer, causes the computer to perform the movement control method according to claim 10.

12. A system comprising:
  a communication target device; and
  an autonomous mobile robot that autonomously moves while communicating with the communication target device,
  wherein the communication target device includes a communicator that transmits predetermined information to the autonomous mobile robot,
  wherein the autonomous mobile robot includes a driver that drives the autonomous mobile robot, a controller that outputs, to the driver, a first control command to move the autonomous mobile robot by a first control amount indicating any one of a pair consisting of a first movement distance and a first movement direction, a pair consisting of a first absolute velocity value and a first velocity direction, and a pair consisting of a first absolute acceleration value and a first acceleration direction, a communicator that receives the predetermined information transmitted from the communication target device, a detector that detects the communication target device, and a direction identifier that identifies a direction in which the communication target device detected by the detector is positioned,
  wherein upon detecting that the predetermined information is no longer received by the communicator, the controller determines a second control amount by which the autonomous mobile robot is to be moved in the direction identified by the direction identifier and which indicates any one of a pair consisting of a second movement distance and a second movement direction, a pair consisting of a second absolute velocity value and a second velocity direction, and a pair consisting of a second absolute acceleration value and a second acceleration direction, and
  wherein the controller generates a second control command to switch the first control amount to the second control amount and move the autonomous mobile robot and outputs the generated second control command to the driver.

* * * * *